United States Patent
Nielsen

(10) Patent No.: US 10,433,484 B2
(45) Date of Patent: Oct. 8, 2019

(54) INDEPENDENT FREQUENCY CONTROL OF THE SHAKER HEAD OF A HARVESTER

(71) Applicant: Nexgen Ag, LLC, Chico, CA (US)

(72) Inventor: Gavin Nielsen, Chico, CA (US)

(73) Assignee: Nexgen Ag, LLC, Chico, CA (US)

( * ) Notice: Subject to any disclaimer, the term of this patent is extended or adjusted under 35 U.S.C. 154(b) by 0 days.

(21) Appl. No.: 15/610,356

(22) Filed: May 31, 2017

(65) Prior Publication Data

US 2017/0339829 A1 Nov. 30, 2017

Related U.S. Application Data

(60) Provisional application No. 62/343,716, filed on May 31, 2016, provisional application No. 62/343,723, filed on May 31, 2016, provisional application No. 62/343,727, filed on May 31, 2016, provisional application No. 62/343,732, filed on May 31, 2016.

(51) Int. Cl.
| | |
|---|---|
| *A01D 46/00* | (2006.01) |
| *A01D 46/26* | (2006.01) |
| *A01D 75/00* | (2006.01) |
| *G06F 3/0484* | (2013.01) |
| *G06F 3/0488* | (2013.01) |
| *G06F 9/451* | (2018.01) |

(52) U.S. Cl.
CPC ............ *A01D 46/26* (2013.01); *A01D 75/00* (2013.01); *G06F 3/04847* (2013.01); *G06F 3/04886* (2013.01); *G06F 9/453* (2018.02); *A01D 2046/266* (2013.01); *G06F 9/451* (2018.02); *G06F 2203/04808* (2013.01)

(58) Field of Classification Search
CPC ...... A01D 46/26; A01D 46/28; A01D 46/285; A01D 75/00; G06F 3/04847; G06F 3/04886; G06F 9/451; G06F 9/453
USPC .................. 56/12.6, 12.8, 328.1, 330, 340.1
See application file for complete search history.

(56) References Cited

U.S. PATENT DOCUMENTS

| | | | | |
|---|---|---|---|---|
| 4,286,426 A | * | 9/1981 | Orlando | A01D 46/28 56/330 |
| 4,982,558 A | * | 1/1991 | Korthuis | A01D 46/28 56/12.6 |
| 5,259,177 A | * | 11/1993 | Windemuller | A01D 46/285 56/12.8 |
| 5,473,875 A | * | 12/1995 | Zehavi | A01D 46/26 56/340.1 |

(Continued)

OTHER PUBLICATIONS

Todd S. Rosenstock et al., journal homepage: www.elsevier.com/locate/scihorti, "A reevaluation of alternate bearing in pistachio," Scientia Horticulturae 124 (2010), pp. 149-152.

(Continued)

*Primary Examiner* — Robert E Pezzuto
(74) *Attorney, Agent, or Firm* — Dergostis & Noah LLP

(57) ABSTRACT

A harvester using shaking to dislodge product from trees in which the shaking in each of at least two inertial force generators is controlled independently of the others. Embodiments provide the flexibility to adapt a harvesting procedure to different product and to adapt the harvesting procedure to different individuals within a particular type of plant, and in real-time.

20 Claims, 14 Drawing Sheets
(1 of 14 Drawing Sheet(s) Filed in Color)

(56) References Cited

U.S. PATENT DOCUMENTS

| | | | | |
|---|---|---|---|---|
| 6,405,516 | B1* | 6/2002 | Orlando | A01D 46/26 56/328.1 |
| 7,918,078 | B2* | 4/2011 | Poggiagliolmi | A01D 46/26 56/340.1 |
| 8,511,051 | B2* | 8/2013 | Pellenc | A01D 46/28 56/330 |
| 8,650,847 | B2 | 2/2014 | Snell | |
| 9,060,465 | B2* | 6/2015 | Vande Voort | A01D 75/00 |
| 9,992,933 | B2* | 6/2018 | Payne | A01D 46/26 |

OTHER PUBLICATIONS

B. Diezma et al., "Monitoring of Fruit Removal for Mechanical Thinning of Peaches," Information and Technology for Sustainable Fruit and Vegetable Production, FRUTIC 05, Sep. 12-16, 2005, Montpellier France, pp. 165-174.

Sergio Castro-Garcia et al., "Video Evaluation of Table Olive Damage during Harvest with a Canopy Shaker," Hort. Technology, Apr.-Jun. 2009 19(2), pp. 261-266.

L. Ferguson et al., "Mechanical harvesting of California table and oil olives," 53 Adv. Hort. Sci., 2010 24(1): pp. 53-63.

U.A. Rosa et al., "Transient Modal Analysis of Removed Mass for Mechanical Thinning of Fruits," Information and Technoligy for Sustainable Fruit and Vegetable Production, Frutic 05, Sep. 12-16, 2005, Montpellier France, pp. 207-216.

Castro-Garcia et al., "Dynamic analysis of olive trees in intensive orchards under forced vibration," https://link.springer.com/article/10.1007/s00468-008-0240-9, Dec. 2008, vol. 22, Issue 6, pp. 795-802.

L. Ferguson et al., "Mechanical harvesting of California table and oil olives," https://www.jstor.org/stable/42882754?seq=1#page_scan_tab_contents, Advances in Horticultural Science, vol. 24, No. 1, Special Issue on Integral Mechanical Harvesting of Oil Olives and the Influence of Growing Systems (2010), pp. 53-63.

G. L. Blanco-Roldán, https://elibrary.asabe.org/abstract.asp?aid=26883, "Effects of Trunk Shaker Duration and Repetitions on Removal Efficiency for the Harvesting of Olive Oils," Published by the American Society of Agricultural and Biological Engineers, St. Joseph, Michigan www.asabe.org.

U.A. Rosa et al., "An electro-mechanical limb shaker for fruit thinning," https://www.sciencedirect.com/science/article/pii/S0168169907002281, Computers and Electronics in Agriculture, vol. 61, Issue 2, May 2008, pp. 213-221.

B. S. Lee et al., "Development of Canopy Volume Reduction Technique for Easy Assessment and Harvesting of Valencia Citrius Fruits," https://elibrary.asabe.orgi/abstract.asp?aid=22286, Published by the American Society of Agricultural and Biological Engineers, St. Joseph, Michigan www.asabe.org, Transactions of the ASABE. 49(6): pp. 1695-1703. (doi: 10.13031/2013.22286) @2006.

S. Castro-Garcia et al., "Preparing Spain and California Table Olive Industries for Mechanical Harvesting," https://www.actahort.org/books/965/965_1.htm, ISHS Acta Horticulturae 965: I International Symposium on Mechanical Harvesting and Handling Systems of Fruits and Nuts, Transactions of the ASABE. 55(6): pp. 2051-2058. (doi: 10.13031/2013.42492) @2012.

M. Y. Hong et al., "Optimum Operating Parameters for a Rotary Drum Shaker for Harvesting *Jatropha curcas* L," https://elibrary.asabe.org/abstract.asp?aid=42492, Published by the American Society of Agricultural and Biological Engineers, St. Joseph, Michigan www.asabe.org, Transactions of the ASABE. 55(6): pp. 2051-2058. (doi: 10.13031/2013.42492) @2012.

Kent M. Daane, et al., "Quarantine Screening and Selection of Imported Natural Enemies of the Olive Fruit Fly," California Olive Committee, Annual Research Report 2008, (Jan. 20, 2009), 97 pages.

Declaration of Gavin Neilsen Under 37 CFR 1.56, U.S. Appl. No. 15/610,356, filed May 3, 2017, signed Apr. 24, 2019, 50 pages.

Document A, referenced within the Declaration of Gavin Nielsen filed herewith. dated Apr. 23, 2013.

Document B, referenced within the Declaration of Gavin Nielsen filed herewith. dated Mar. 27, 2015.

Document C, referenced within the Declaration of Gavin Nielsen filed herewith. dated 2012.

Document D, referenced within the Declaration of Gavin Nielsen filed herewith. dated Jan. 17, 2014.

Document E, referenced within the Declaration of Gavin Nielsen filed herewith. dated 2014.

Document F, the Declaration Gavin Nielsen filed herewith. dated 2015.

Document G, referenced within the Declaration of Gavin Nielsen filed herewith. dated 2013.

Document H, referenced within the Declaration of Gavin Nielsen filed herewith. dated Jan. 17, 2014.

Document I, referenced within the Declaration of Gavin Nielsen filed herewith. dated Feb. 9, 2015.

Information Disclosure Statement Pursuant to 37 CFR 1.97-1.98, U.S. Appl. No. 15/610,356, dated May 31, 2017, signed Apr. 24, 2019, 30 pages.

* cited by examiner

INDEPENDENT FREQUENCY CONTROL OF THE SHAKER HEAD OF A HARVESTER

CROSS-REFERENCE TO RELATED CASES

This application claims priority to the following U.S. Provisional Patent Applications, which are each incorporated by reference in their entirety: U.S. Provisional Patent Application No. 62/343,716, entitled "INDEPENDENT FREQUENCY CONTROL OF THE SHAKER HEAD OF A HARVESTER," filed May 31, 2016; U.S. Provisional Patent Application No. 62/343,723, entitled "A FREQUENCY-FREQUENCY GRAPHICAL USER INTERFACE FOR INDEPENDENT FREQUENCY CONTROL OF THE SHAKER HEAD OF A HARVESTER," filed May 31, 2016; U.S. Provisional Patent Application No. 62/343,727, entitled "A VALUE-TIME GRAPHICAL USER INTERFACE FOR INDEPENDENT FREQUENCY CONTROL OF THE SHAKER HEAD OF A HARVESTER," filed May 31, 2016; and U.S. Provisional Patent Application No. 62/343,732, entitled "COOLING SYSTEM FOR A SHAKER HEAD OF A HARVESTER," filed May 31, 2016.

TECHNICAL FIELD

The present invention relates to the field of agricultural technology, including, more particularly, to methods and systems for harvesting tree crops.

BACKGROUND

Agricultural harvesting for many different tree crops is accomplished through inertial trunk shaking. Exemplary crops include almonds, pistachios, prunes, olives and walnuts, to name a few. With inertial trunk shaking, a portion of the machine, called the "shaker head" is clamped onto the trunk or a major scaffold of the tree. Then eccentric weights are made to spin and generate inertial forces that transfer vibration into the tree. The vibration travels up the tree and through the branches, ultimately causing the product to detach and fall either to the ground or to a catching frame. For many crops and in many places this practice has replaced hand-harvesting methods, which are costly and challenging for growers. The practice also helps optimize the use of land area. Realizing these benefits makes growers more competitive in the global market.

One challenge that faces operators of this equipment is the appropriate tuning of this system to best remove product while minimizing damage to the tree; a challenging balance because these are diametrically opposed optimization targets. Currently, this challenge is addressed primarily "in the lab" (or probably in a workshop), through trial and error, where a reasonable baseline speed, or frequency, is established through various gearing techniques. Since one wants to optimize the frequency to be close the right natural frequencies of the tree, lab optimization begins to improve the frequency issue, but for simplicity of design, existing machines typically work with two eccentrics that are in a fixed ratio relationship to that baseline frequency. This ratio is typically a function of non-adjustable gearing, which means that even with the small changes to the baseline frequency that a change to the engine throttle might produce, the ratio of the speeds stays fixed. This leads to the second challenge: optimization of output geometry.

The geometric position output of a shaker head (in the horizontal plane) that has a single, spinning eccentric is a simple ellipse. When two eccentrics are spinning at different frequencies, this ellipse changes to be a trochoid. In general, the equation that governs the output position of the head (working from a simplified, free-body-diagram point of view), is shown below:

$$x(t)=E_1 \cos(F_1 \ast t)+E_2 \cos(F_2 \ast t) \quad \text{(Eq. 1)}$$

$$y(t)=E_1 \sin(F_1 \ast t)+E_2 \sin(F_2 \ast t) \quad \text{(Eq. 2)}$$

$$F_b=F_1-F_2$$

$$E_r=E_1/E_2$$

$$F_r=F_1/F_2$$

Where
x(t) is the horizontal position of the head (in the horizontal plane) as a function of time
y(t) is the vertical position of the head (in the horizontal plane) as a function of time
$E_1$ is the eccentricity of the first eccentric (with dimension mass*length)
$E_2$ is the eccentricity of the second eccentric (with dimension mass*length)
$F_1$ is the frequency of the first eccentric (with dimension $time^{-1}$)
$F_2$ is the frequency of the second eccentric (with dimension $time^{-1}$)
t is time
$F_b$ is the beat frequency (difference in the constituent frequencies)
$E_r$ is the eccentricity ratio (dimensionless)
$F_r$ is the frequency ratio (dimensionless)

For linear actuators, E1 and E2 may be functions of time. This can be accomplished by varying the magnitude of the travel (peak-to-peak) of the moving mass. For a given frequency, as one increases the peak-to-peak magnitude of travel, the output will also increase. This also leads to nearly arbitrary output geometry and super-positioned frequencies, since there is no restriction that physics imposes any more to have a sinusoidal output per axes. X(t) and Y(t) become nearly arbitrary, though there are practical limitations for the length of travel of each actuator and for the mass/frequency combinations that result in force/power output limitations. For example, at any given time the actuator could deliver varying forces at a given frequency or vary frequencies at a given force. But, because of the inertial properties of the mass at the end of the linear actuator and the total travel capability of the actuator and the maximum speed of the actuator and the internal actuator force limitations, the actuator itself will be bounded only, it will have upper and lower bounds for those forces. In the same way, the output geometry size will have maximum bounds and the output frequencies will have minimums and maximums related to the same parameters. The shape of the trochoid (not the absolute size) can be completely determined by the ratio of eccentricities and the ratio and sign of frequencies. Since a typical machine has fixed eccentrics and (as already described) fixed frequency ratios, the geometric position output of a typical head does not vary at all, regardless of the baseline frequencies and size of the eccentrics.

The shape of the trochoid (not the absolute size) can be completely determined by the ratio of eccentricities and the ratio and sign of frequencies. Since a typical machine has fixed eccentrics and (as already described) fixed frequency ratios, the geometric position output of a typical head does not vary at all, regardless of the baseline frequencies and size of the eccentrics.

FIG. 1 depicts examples of trochoid shapes based on different frequency ratios. With $E_r$ fixed at the value of 1.6667 and $F_r$ varied, FIG. 1 depicts the resulting variety of trochoid shapes generated.

Each tree, as a complex mechanical structure, is unique in its vibratory transmission characteristics. Good cultural practices in pruning and consistency in treatment tend to yield statistically similar trees in a given block but this really depends on many other factors that are out of control of the grower, such as soil-type distribution throughout a given block. Additionally, hand-pruning is usually carried out by manual laborers, who vary significantly in their judgment calls as to what constitutes a wise choice for pruning cuts (and pruning cuts dictate much of the vibratory transmission characteristics). Soil moisture levels change constantly due to environmental factors such as weather and water availability, which changes the characteristics of the effective fulcrum formed by the ground and the trunk. Root structure varies significantly, which also changes how "soft" that ground-trunk fulcrum behaves. Furthermore, as a tree grows the mechanical properties of the wood change with age, as well as the size and geometry of the tree.

Year-to-year crop loads change dramatically, and different crop loads require different types of frequencies and geometries. In short, there is such vast variability from tree to tree that existing shakers often shake much harder than they need to, and shake at the wrong frequencies and wrong geometries—dumping unnecessary energy into the tree. This energy is lost in other forms (other than kinetic energy at the product), typically in short or long-term damage to the tree (e.g., root damage, trunk damage, scaffold/branch damage, defoliation, etc.). In addition, some of the crop is often left on the tree, which for the grower is literally unrealized profit.

Lastly, a tree's mechanical system changes as a shake is taking place because the crop is being removed, which changes the tree's mass distribution and the natural frequencies. The mechanical system also changes because the roots are moving in the ground, which changes how the soft fulcrum behaves. Different crops types and ages of trees evolve their dynamic state at different rates and have different safe envelopes.

It is not impossible to change the gearing of a typical shaker head: new sheaves, pumps, motors, etc., can be swapped in to create a new (albeit fixed) ratio. The problem with this is that it takes a large amount of time (often hours) to make this change just once. Such "tuning" of the shaker is very inefficient and time-expensive. In the middle of a harvest, time is money. Therefore, there is a disincentive to take the time (money) to try and make adjustments to a shaker head once a user feels that they are close enough.

For example, a typical tuning is usually performed "at the shop" and accomplished by changing the combination of gears, sprockets, pumps, motors, etc. Such tuning is not typically performed in the field. The small amount of tuning that is done in the field generally amounts to the following: tuning the eccentrics (typically two different eccentrics—e.g., changing their weights and manually setting a fixed speed ratio between the two), and either setting a fixed engine RPM level, or figuring out the sequence of how to move the throttle pedal to get the response wanted (very rough).

However, the typical tuning is unsatisfactory for a number of reasons. For example, tuning by way of engine throttle does not tune each eccentric individually, since they are each turning at a fixed ratio to the engine RPM. Tuning by way of varying the throttle via a pedal or lever, also does not allow a consistent, transient response—if the user is supposed to follow a shaking procedure by changing the engine throttle with their foot, it is very hard to make that procedure repeatable. Manually setting a fixed engine speed does not allow a user to take advantage of their real-time perception of how a tree responds to a particular shaking procedure. Setting a fixed or manual speed does not allow any intuitive sense or feel for the pattern, which is critical in converging upon an optimal shaking pattern without an automated solution. And, as discussed, the process is time-consuming. Other methods are very slow, while this method can literally be in real-time.

In the United States, there are three major players in the inertial trunk shaker space for fruit and nut harvesting. These systems typically feature a self-propelled chassis, a carriage, a shaker head with a two-jaw clamping system. They typically feature a two-eccentric system driven by a single motor coupled by belts and sprockets of different diameters to accomplish the fixed frequency ratio.

Orchard Machinery Corporation (OMC) is located in Yuba City, Calif. and produces a wide range of equipment for the orchard. Their current website address is www.shakermaker.com. They currently produce side-by-side systems (Magnum Catchall VII Series II), monoboom systems (Magnum Monoboom Series V), side-mount systems (Magnum Sprint Series V) and umbrella systems (Catchall V).

Orchard-rite Ltd., Inc. is located in Yakima, Wash. and produces several models, all targeted at nut shaking in particular. Their current website is www.orchard-rite.com. They produce a side-mount system (The Bullet) and a monoboom system (The MonoBoom).

Coe Orchard Equipment is located in Live Oak, Calif. and produces a variety of different equipment. Their current website is www.coeshakers,com. The produce a side-by-side system (The C7-E Shaker and L2-E Receiver), a side-mount system (S7 Side Mount Shaker) and a monoboom system (The M7 Mono Boom Shaker).

Therefore, there exists a need for a tree harvesting technology that can easily modify key characteristics of its shaker head to provide more optimal tuning to accommodate different trees and changing conditions. Those elements in question are the head's frequencies, specifically the individual frequencies themselves and in combination, the ratio between them.

BRIEF DESCRIPTION OF THE DRAWINGS

The patent or application file contains at least one drawing executed in color. Copies of this patent or patent application publication with color drawings will be provided by the Office upon request and payment of the necessary fee.

The embodiments are illustrated by way of example and not limitation in the figures of the accompanying drawings, in which like references indicate similar elements, and in which.

DETAILED DESCRIPTION

Embodiments described within provide a tree harvesting technology that can easily modify key characteristics of its shaker head to provide more optimal tuning to accommodate different trees and changing conditions. The modified characteristics include a shaker head's shaking frequencies, specifically the individual frequency of each shaker head and, in combination, the ratio between them. Embodiments include an apparatus that may control each of the eccentric frequencies individually. Driving the eccentric frequencies independently (Independent Frequency Control (IFC)) gives the flexibility to adapt the harvesting procedure to different trees and also to design patterns out in the field that evolve during the shake of an individual tree. Instead of making any assumptions about the right ratio or speeds, embodiments of IFC make the time-frequency profile of each eccentric independent. Since these frequencies combine to form a beat frequency as well, IFC also provides indirect control of the beat frequency resultant, which adds another facet of control to give more freedom to the person in the field who performs the tuning.

Embodiments of IFC allow not only frequency magnitude control, but also directional control of the spinning eccentrics. This gives us the geometric freedom to vary what kind of trochoid we would prefer (Epitrochoid or Hypotrochoid), and to achieve a very low beat frequency (if the eccentrics are common-rotating ($F_r>0$)) or a higher beat frequency (if they are counter-rotating ($F_r<0$)). Having the flexibility in the field to make such changes in seconds, instead of hours, results in more optimal harvesting and ultimately more money for all parties involved.

Embodiments (both dual-rotor and linearly actuated) allow the quick modification of variables in the field to help with optimizing the shaking for a particular tree or type of tree, which overcomes a major limitation of typical systems. The independent control of the frequencies of two or more oscillators allows the shaker head to deposit appropriate amounts of energy into the frequency bands that are the most helpful for removing product and are the least destructive to the tree.

Figure 2:
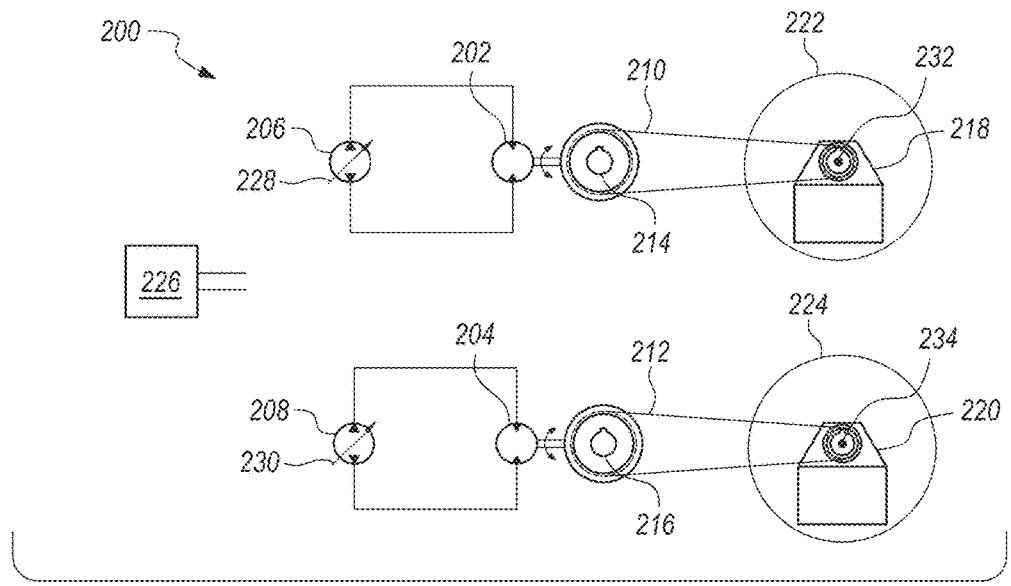
FIG. 2 is a schematic illustrating an embodiment of a system for independent frequency control of a shaker head.
Figure 9:
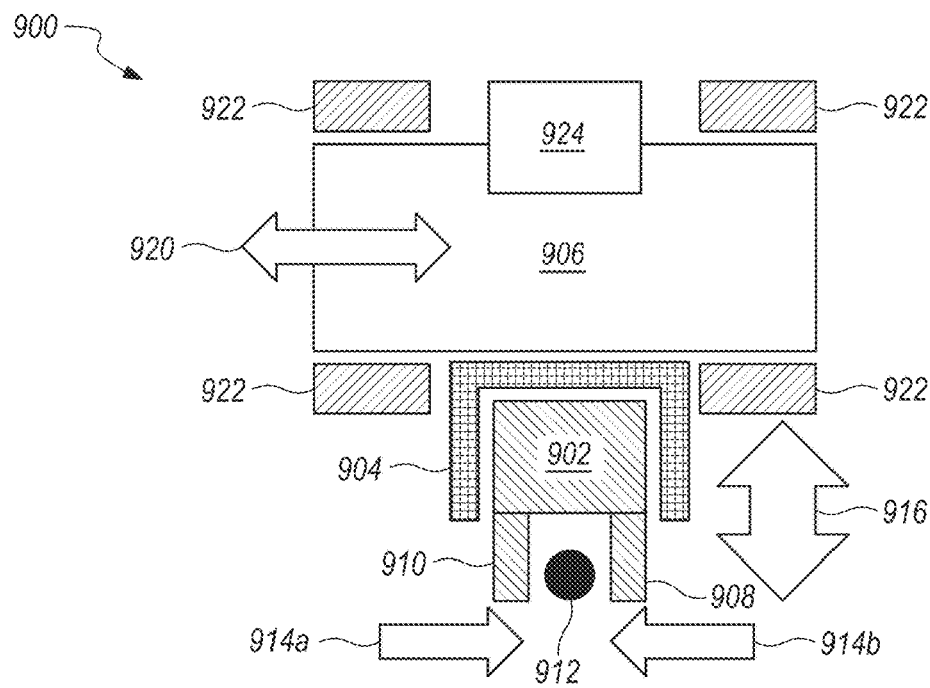
FIG. 9 is a planform top view illustrating an embodiment of a system for independent frequency control of a shaker head employing a side-mount system.
Figure 10:
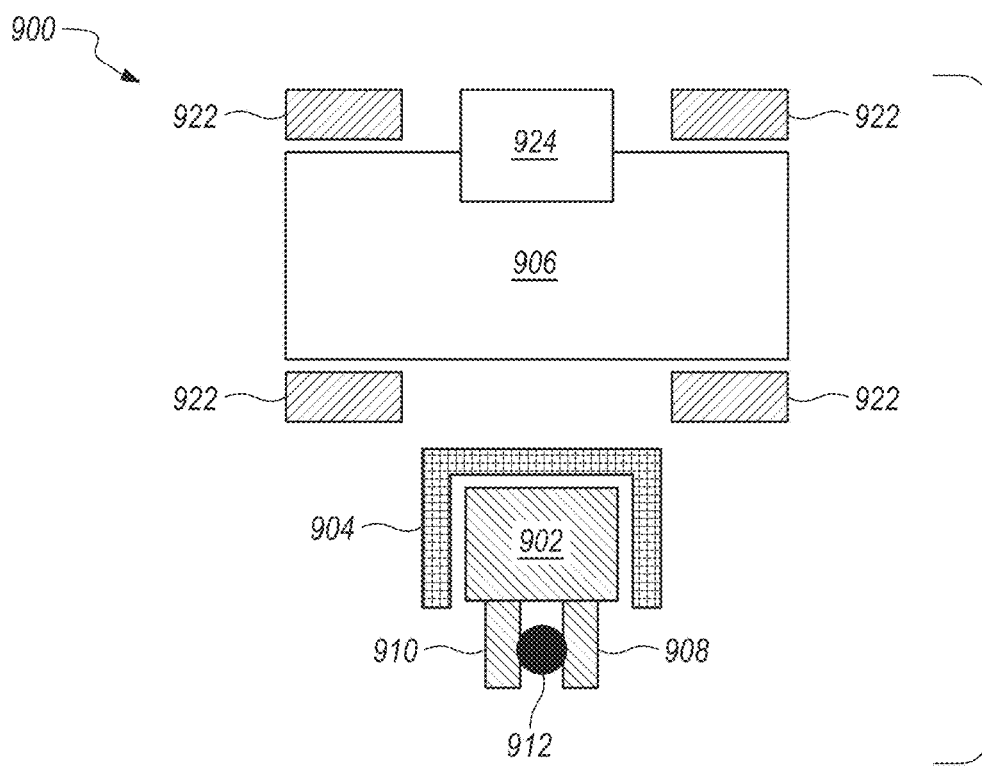
FIG. 10 is a planform top view illustrating an embodiment of a system for independent frequency control employing a side-mount system.

FIG. 2 is a schematic illustrating an embodiment of a system 200 for independent frequency control of a shaker head (see, e.g., FIGS. 9 and 10, head 902). In FIG. 2, a prime mover 226 (e.g., a diesel engine) drives two fixed-displacement hydraulic motors 202, 204 with two variable displacement hydraulic pumps 206, 208. In turn, pumps 206, 208 drive fixed displacement hydraulic motors 202, 204, which by way of sprockets 214, 216 and belt couplers 210, 212 rotate eccentric masses 218, 220 within chambers 222, 224 about axes 232, 234. The rotation of each eccentric mass 218, 220 creates a vibration of the system based on the speed of the rotation. For this reason, systems with rotating masses may be "speed" controlled or "frequency" controlled. The variable displacement, plus directional capabilities (forward or reverse) of pumps 206, 208 provide the independent control needed to accomplish independent frequency control of an eccentric mass 218 and an eccentric mass 220. In the embodiment, variable-displacement pumps 206, 208 each have an electro-hydraulic control unit 228, 230 that interfaced with an onboard computing system (e.g., a computing device 1900, FIG. 19) to allow for storing velocity profiles and further interfacing to graphical user interfaces (see FIGS. 16 and 17).

The configuration of FIG. 2 may be modified in several ways to optimize the energy transfer. For example, by pairing a variable-displacement motor (instead of fixed displacement motors 202, 204) with variable displacement, bi-directional pumps 206, 208 the hydraulic energy transfer stages may be optimized (e.g., as when an automotive transmission optimizes the power transfer from the engine to the tires). For example, for initial start-up shaking speeds, the largest displacement on the variable displacement motor may be used to maximize the torque. Then, then, for higher speeds, a smaller displacement may be used—decreasing torque for increased speed.

Figure 3:
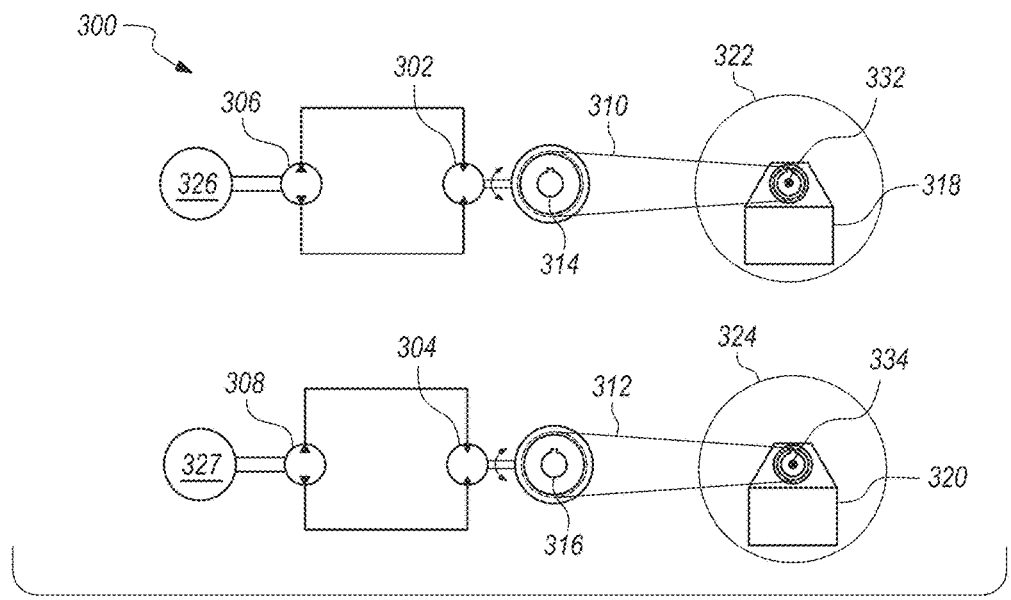
FIG. 3 is a schematic illustrating an embodiment of a system for independent frequency control of a shaker head employing electric motor drivers.

FIG. 3 is a schematic illustrating an embodiment of a system 300 for independent frequency control of a shaker head employing variable-speed, variable-direction, electric motors 326, 327 as prime moves 326, 327. In FIG. 3, prime mover 326 drives a variable-displacement hydraulic pump 306. Pump 306 drives a fixed-displacement hydraulic motor 302. In turn, motor 302, by way of sprocket 314 and belt 310, rotates eccentric mass 318 within chamber 322 about axis 332. Similarly, a prime mover 327 drives a fixed-displacement hydraulic pump 308. Pump 308 drives a fixed-displacement hydraulic motor 304. In turn, motor 304, by way of sprocket 316 and belt 312, rotates eccentric mass 320 within chamber 324 about axis 334.

FIG. 3 illustrates that embodiments may use different prime movers and other hydraulic configurations are contemplated. For example, in FIG. 3, with fixed-displacement pump 308 connected to electric motor 327 whose speed and polarity are variable (e.g. through a variable frequency/phase inverter in the case of an AC motor, or a variable voltage/polarity source in the case of a DC motor), this allows both the speed (frequency) and the direction of the system to be varied. Also note that, in FIG. 3, because prime movers 326, 327 are variable-speed and variable-direction electric motors, the hydraulic pump directly powered by prime mover 326, 327 may be either fixed-displacement pump 308 or variable-displacement pump 306.

Figure 4:
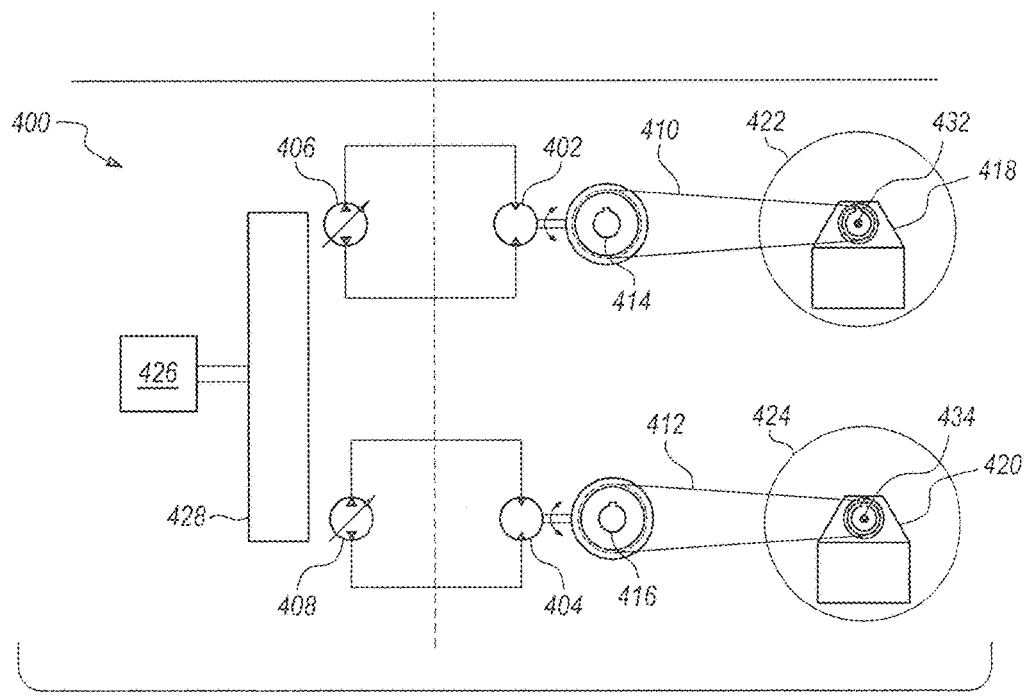
FIG. 4 is a schematic illustrating an embodiment of a system for independent frequency control of a shaker head employing separate hydraulic circuits.
Figure 18:
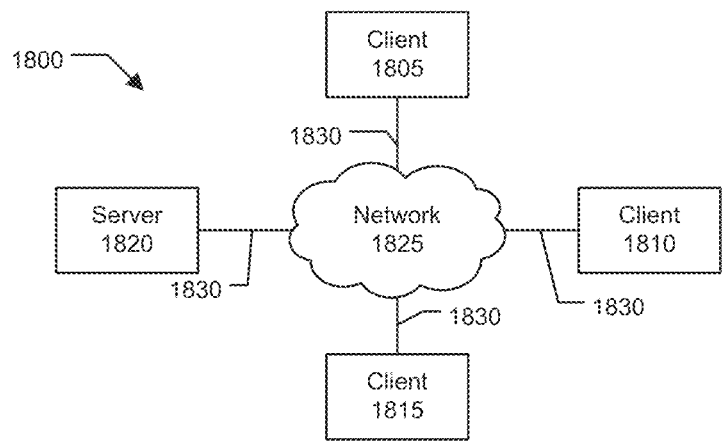
FIG. 18 is a simplified block diagram of a distributed computer network of an embodiment of independent frequency control of a shaker head.

FIG. 4 is a schematic illustrating an embodiment of a system 400 for independent frequency control of a shaker head employing separate hydraulic circuits. In the embodiment, shaking frequencies may be independently controlled. The power from prime move 426 is transmitted from the engine (if that is the prime mover) by pump drive (or gearbox) 428 to drive variable displacement hydraulic pumps 406, 408, which in turn drive fixed-displacement hydraulic motors 402, 404. Motors 402, 404 may be coupled directly or indirectly to the eccentrics. In the embodiment, motors 402, 404, by way of sprockets 414, 416 and belts 410, 412, rotate eccentric masses 418, 420 within chambers 422, 424 about axes 432, 434. In the embodiment, independent control is provided by two completely separate hydraulic circuits (pump 406 to motor 402, and pump 408 to motor 404), with the displacement and direction of the pumps varied separately, e.g., via control by computer 1800 (FIG. 18). FIG. 4 also depicts, separated by a dotted line, which components of the embodiment are mounted on a shaker chassis (see, e.g., FIGS. 9 and 10, chassis 906) and which components are mounted on a shaker-head (see, e.g., FIGS. 9 and 10, head 902).

Figure 5:
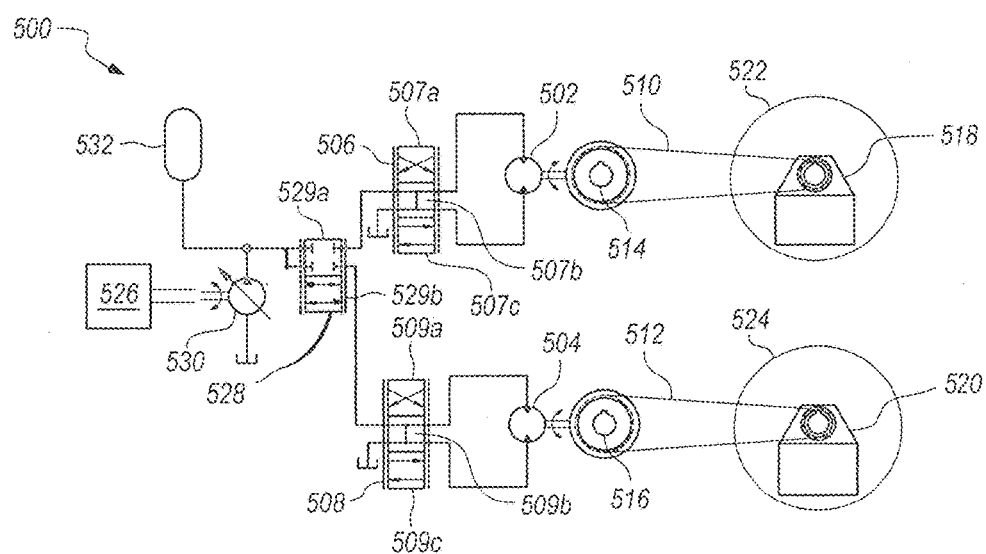
FIG. 5 is a schematic illustrating an embodiment of a system for independent frequency control of a shaker head employing fixed displacement hydraulic motors.

FIG. 5 is a schematic illustrating an embodiment of a system 500 for independent frequency control of a shaker head employing fixed displacement hydraulic motors 502, 504 powered by a prime mover 506. In the embodiment, prime mover 506 is an engine, but may also be, e.g., an electric motor in another embodiment. Hydraulic fluid is pumped from a variable displacement hydraulic pump 530 to be used directly in powering fixed displacement hydraulic motors 502, 504 as well as being stored in an accumulator 532. This stored and immediate energy from accumulator 532 and from pump 530 is divided though a flow valve 528 to direct either no fluid flow (as shown, with valve 528 in state 529a), or direct fluid flow to valves 506, 508 (with valve 528 in state 529b). Valves 528, 506, 508 control both the direction of the fluid and the amount of the fluid that flows, with the amount of fluid being controlled using variable orifices (not shown). Valves 506, 508 direct fluid to fixed displacement motors 502, 504, which may be controlled to turn in either direction (depending on the state of valves 506, 508) at any of an infinite number of speeds (depending on the flow from valves 528, 506, 508). Motors 502, 504 may be fixed displacement or variable displacement motors. The coupling to spinning eccentric masses 518, 520 may be as shown, with synchronous belts 510, 512 and pulleys 514, 516, or with non-synchronous belts (such as v-groove belt), with chain, through a gear/gearbox or the motor could drive the eccentrics directly via a concentric shaft coupling.

In an embodiment, shaking may be accomplished using a configuration of linear actuators, e.g., two linear actuators that are orthogonal to each other in the horizontal plane. Such an embodiment provides independent control of each axis. As a result, influence over each axis and the geometric output geometries is dependent on the sequence of forces from each associated actuator. Nearly arbitrary geometric patterns may be created through a configuration like this. The patterns would be limited by the capabilities of the actuators and the context of the system they operate in (e.g., overall weight, tree variabilities, etc.), but the dual-linear actuator embodiment provides exceptional capabilities.

In an embodiment, more than two linear actuators are added to a system to provide advantages based on actuator size and cost tradeoffs, or to add to the effectiveness of common patterns in certain situations. The linear actuators may be arranged in non-orthogonal patterns for space considerations, which might allow for minimizing the volume of a shaker head—an often preferable benefit.

Figure 6:
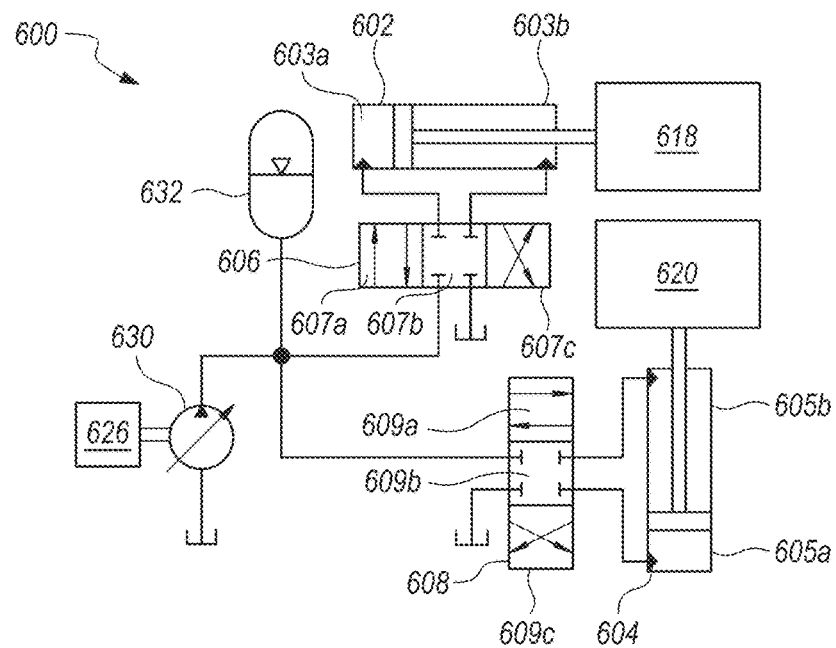
FIG. 6 is a schematic illustrating an embodiment of a system for independent frequency control of a shaker head employing orthogonal linear hydraulic actuators.

FIG. 6 is a schematic illustrating an embodiment of a system 600 for independent frequency control of a shaker head employing orthogonal linear hydraulic actuators 602, 604. In an embodiment, moving masses 618, 620 back and forth (linearly) provides the same kinds of shaking forces as spinning eccentrics without also generating centripetal forces. Where a single eccentric has a simple positional output geometry (a circle or ellipse), a single linear actuator provides a simple output geometry (a line). Because of the linear output geometry of the embodiment, the arrangement of linear actuators 618, 620 is preferably at least slightly askew, and more preferably orthogonal, so as to allow a multi-directional output pattern. In the embodiment, prime mover 626 is an engine, but may also be, e.g., an electric motor in another embodiment. Hydraulic fluid is pumped from a variable displacement hydraulic pump 630 to be used directly in powering actuators 618, 620 as well as being stored in an accumulator 632. This stored and immediate energy from accumulator 632 and from pump 630 is directed to control valves 606, 608 for actuating hydraulic cylinders 602, 604, respectively. Each of control valves 606, 608 has three states. Regarding control valve 606, in a first state 607a, fluid is directed to a rear chamber 603a of hydraulic cylinder 602 and allowed to flow from a front chamber 603b, which works to drive mass 618 forward (to the right, as seen in the figure). In a second state 607b, no fluid is allowed to flow from either chamber, which works to make mass 618 stationary. In a third state 607c, fluid is directed to the front chamber 603b and flows from rear chamber 603a, which works to drive mass 618 to the rear (to the left, as seen in the figure). Regarding control valve 608, in a first state 609a, fluid is directed to a front chamber 605b of hydraulic cylinder 604 and flows from a rear chamber 605a of hydraulic cylinder 604, which works to drive mass 620 to the rear (downward, as seen in the figure). In a second state 609b, no fluid is allowed to flow from either chamber, which works to make mass 620 stationary. In a third state 609c, fluid is directed to rear chamber 605a and allowed to flow from front chamber 605b, which works to drive mass 620 forward (upward, as seen in the figure). With the appropriate independent control of valves 602, 604 by, e.g., computing device 1900, inertial masses 618, 620 may be independently moved linearly back and forth, the frequency of the movement creating the desired vibration.

Figure 7:
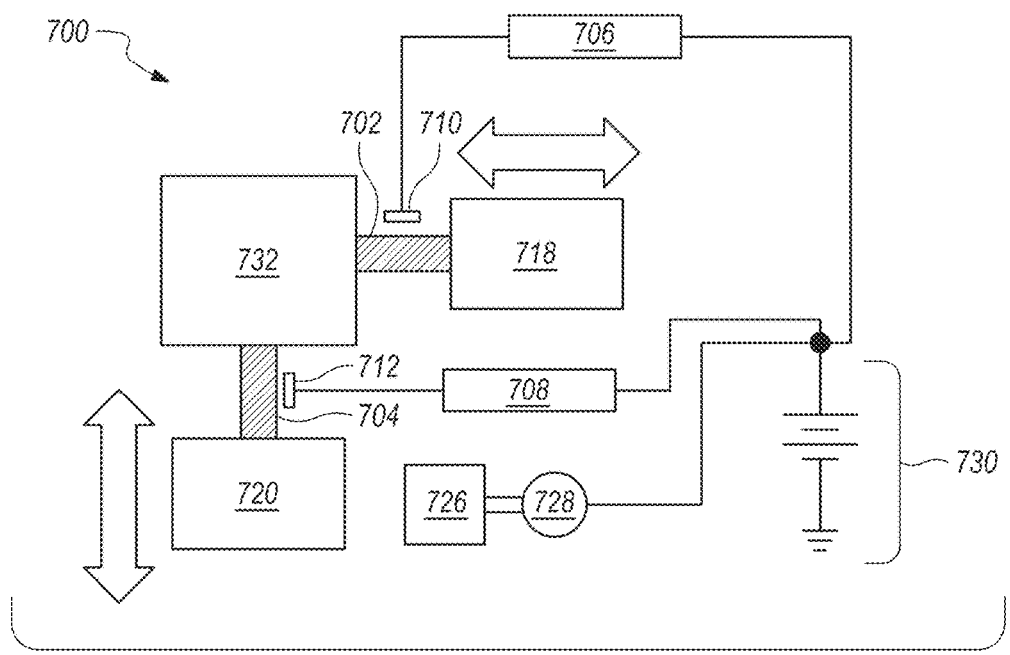
FIG. 7 is a schematic illustrating an embodiment of a system for independent frequency control of a shaker head employing smart material linear actuators.

FIG. 7 is a schematic illustrating an embodiment of a system 700 for independent frequency control of a shaker head 732 employing smart material linear actuators 702, 704. Linear actuation may be implemented in many different ways. One way is by using hydraulic cylinders (see FIG. 6). Another way is by using other linear actuators, such as smart actuators 702, 704, which may use, e.g., piezoelectric ceramics, magnetostrictive materials, or dielectric elastomers. Actuators 702, 702 are positioned with one side attached to the framework of a shaker head 732 (see also, e.g., FIGS. 9 and 10, head 902) the other side attached to inertial masses 718, 720. In FIG. 7, a prime mover 726 powers a generator 728. The energy from generator is provided to controllers 706, 708 and to an energy storage device 730. Controllers 706, 708 control the energy supplied to actuators 702, 704, respectively. Controllers 706, 708 may modulate the power to actuators 702, 704 causing actuators 702, 704 to contract or expand accordingly. As a result of the expansion and contraction of actuators 702, 704, masses 718, 720 move in the directions indicated at the frequency of expansion and contraction. With the appropriate independent control of actuators 702, 704 by controllers 706, 708, respectively, inertial masses 718, 720 may be independently moved linearly back and forth, the frequency of the movement creating the desired vibration. In an embodiment, controllers 706, 708 may themselves controlled by, e.g., a computing device 1900.

For embodiments employing linear actuator configurations, it is also preferable that each actuator is controlled independently as was described with respect to the dual-rotor (dual rotating mass) shaker configuration. If not independently controlled, e.g., if a pair of linear actuators were coupled through gearing or circuit topologies that control the actuators in a coupled way relative to each other, the linear actuator arrangement would re-create many of the limitations of the typical dual-rotor actuator.

In an embodiment (not shown), more than two actuators (e.g., rotating or linear actuators) may be used and controlled independently. A benefit of this arrangement is that, for example with three actuators, three different frequencies may be controlled simultaneously and a total of three different beat frequencies managed (implicitly) as well. This may be modeled by modifying the equations above and adding one more term to each x/y equation, and adding two more symbols, as shown below.

$$x(t) = E_1 \cos(F_1(t)*t) + E_2 \cos(F_2(t)*t) + E_3 \cos(F_3(t)*t) \quad \text{(Eq. 3)}$$

$$y(t) = E_1 \sin(F_1(t)*t) + E_2 \sin(F_2(t)*t) + E_3 \sin(F_3(t)*t) \quad \text{(Eq. 4)}$$

$$F_{b1} = F_1 - F_2$$

$$F_{b2} = F_1 - F_3$$

$$F_{b3} = F_2 - F_3$$

The geometric pattern output of an arrangement with three rotary actuators is no longer a trochoid, but still possesses some of the salient characteristics. To characterize the difference, the definition of the frequency ratios is extended to include the ratios between the constituent frequencies. See the definitions of the three frequency ratios, below.

$$F_{r12} = F_1/F_2$$

$$F_{r13} = F_1/F_3$$

$$F_{r23} = F_2/F_3$$

Figure 8:
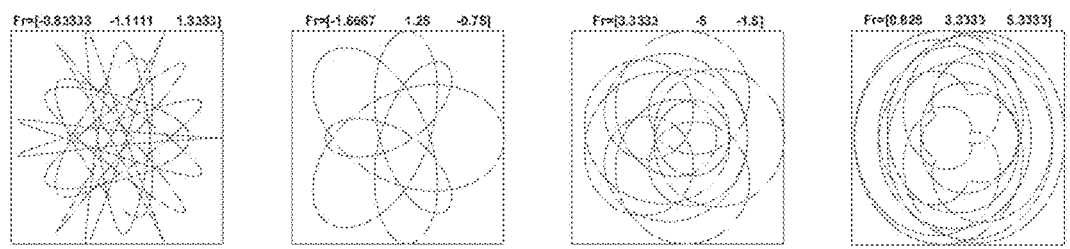
FIG. 8 depicts examples of trochoid shapes based on modified trochoid geometry ratios.

Since these ratios form a three-dimensional space of combinations, we can express them as an ordered triplet, $F_r = [F_{r12}, F_{r13}, F_{r23}]$. Four combinations are shown in FIG. 8, which depicts examples of trochoid shapes based on modified trochoid geometry ratios.

Linearly-actuated shakers have the ability to generate multiple frequencies at the same time due to the superposition of signals in time. This allows a nearly arbitrary number of primary frequencies with all of the implied beat frequencies that result from those primary frequency interactions. The potential geometric output of linearly actuated systems with two or more actuators that are at least slightly askew is limited by the physical constraints of the actuators (force, displacement, etc.) and the control capability of the control system (control bandwidth, sample time, etc.). In this sense, for embodiments using linearly-actuated shakers the frequency content and geometric position output in the plane of shaking is almost arbitrary.

A USE CASE

In an embodiment, a shaker head may be mounted on overall shaker machinery. Typically the machinery includes a self-propelled chassis with its own power source. In some embodiments, a shaker head may be mounted on a tractor three-point or skid-steer platform. In some embodiments, the shaker head may be oriented perpendicularly to the wheels' direction of travel. These are called "side-mount" machines. In some embodiments, shaker head may be mounted to the front of the chassis, which are typically referred to as "mono-boom" machines.

FIG. 9 is a planform top view illustrating an embodiment of a system 900 for independent frequency control of a shaker head 902 employing a side-mount system. A side-mount chassis 906 is typically a three-wheeled design, but sometimes has four wheels 922 (not eccentric wheels, but ground-drive wheels). These systems 900 typically mount shaker head 902 to the right of the operator cab 924 on a carriage 904 which positions the shaking head appropriately for clamping to the tree 912 using jaws 908, 910 and subsequently for shaking.

In FIG. 9, shaker head 902 is connected to carriage 904 through some manner of hanger or isolator which provides vertical support but allows head 902 to float as much as possible in the horizontal plane. This basically makes shaker head 902 a pendulum. Thus, it is preferable to make the hanger (not shown) as long as practically possible, to allow nearly planar motion of the head.

Head 902 needs some means of attaching itself (usually termed clamping) to tree 912. This is typically accomplished by a two-jaw 908, 910 configuration. Others may have three jaws or more. A rubber pad is typically used to interface with bark of tree 912 while not hurting the tree, since most of the time the shaker head is made of steel or another similarly rigid material, so that vibrations may be transmitted efficiently.

The first phase of a shaking sequence involves the positioning of chassis 906 to get carriage 904 within range of tree 912. The second phase involves carriage 904 moving as allowed 916 to position head 902 in the best position to clamp onto tree 912. In the third phase, head 902 causes jaws 908, 910 clamp onto tree 912. In an embodiment, jaws 908, 910 may move in parallel, opposing directions 914a, 914b, and in other embodiments, the jaws may clamp using, e.g., a scissoring action. Once tree 912 is clamped within jaws 908, 910, the tree-shaker head vibration system is formed (see FIG. 10, which is a planform top view illustrating the embodiment 900 of a system for independent frequency control employing a side-mount system with a tree clamped and ready to shake). The fourth phase includes the actual shaking process, which might be different for each tree (as is possible in various embodiments), or may be a perfect copy of the process performed on the previous tree. Once the shake sequence phase has been completed and the head has stopped vibrating, the jaws are unclamped from the tree, the carriage pulls the head back the chassis, and the chassis positions the vehicle for the next tree.

Figure 11:
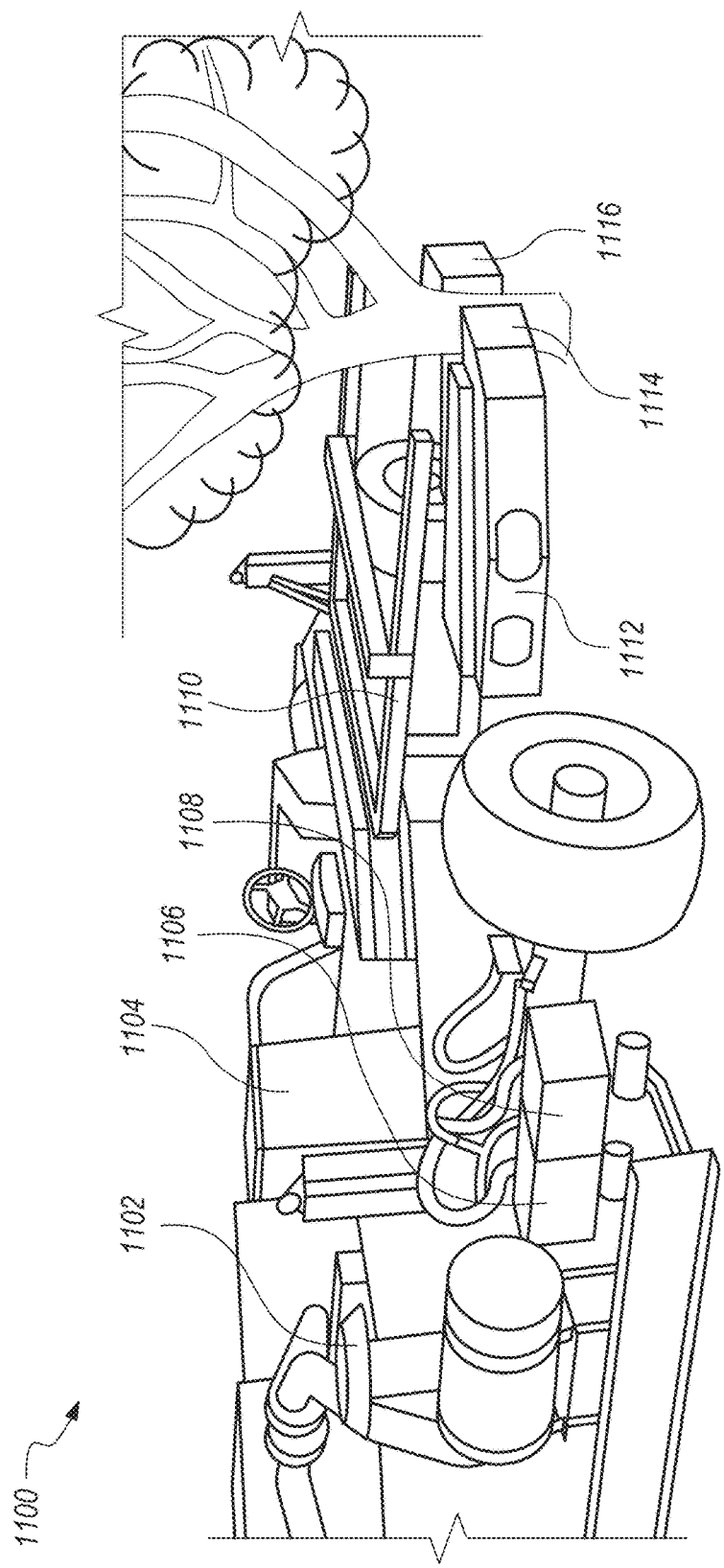
FIG. 11 is a perspective view illustrating an embodiment of a system for independent frequency control of a shaker head employing a dual rotary-actuated shaker head.

FIG. 11 is a perspective view illustrating an embodiment of a system 1100 for independent frequency control of a shaker head employing a dual rotary-actuated shaker head 1106 (also "dual-rotor shaker head"). In FIG. 11, a prime mover 1102 is a diesel engine. Prime mover 1102 is connected through a gearbox to two independently controlled, variable-displacement hydraulic pumps 1106, 1108. Pumps 1106, 1108 are controlled electronically by onboard computing system 1104 (within the box). Pumps 1106, 1108 are hydraulically connected to hydraulic motors (not shown) attached to shaker head 1112. Carriage 1110 is used to position shaker head 1112 with respect to the tree. Hydraulic cylinders cause jaws 1114, 1116 of shaker head 1112 to clamp to the tree. Properly clamped to the tree, shaker head 1112 becomes rigidly coupled to the tree and, as a result, may efficiently impart the combined vibratory energies of the independently-controlled force generators (e.g., eccentric rotating masses 218, 220, FIG. 2) into the tree. Jaws 1114, 1116 have pads that interface between the steel of head 1112 and the wood of the trunk.

One aspect of an embodiment is the ability to not just change the frequencies independently, but to change them independently and change them during a shake sequence—during the actual shaking. This can be meant two ways and both ways are intended. In an embodiment, the shake sequence may be a pre-programmed set of speeds that generate a proportional set of frequencies during the course of the shake (as discussed, both wheels have independent program vectors). In another embodiment, the user may modify and tune the frequencies in real-time during the shake, the frequency profile for each mass being modified and tuned independently. Being able to store a frequency profile and also program or change a frequency profile in real-time is enabled by a computing system (e.g., computing device 1900). In an embodiment, a pre-programmed shake sequence may be initiated and, during the pre-programmed sequence, the user may re-program or change the frequency profile in real time.

Figure 12:
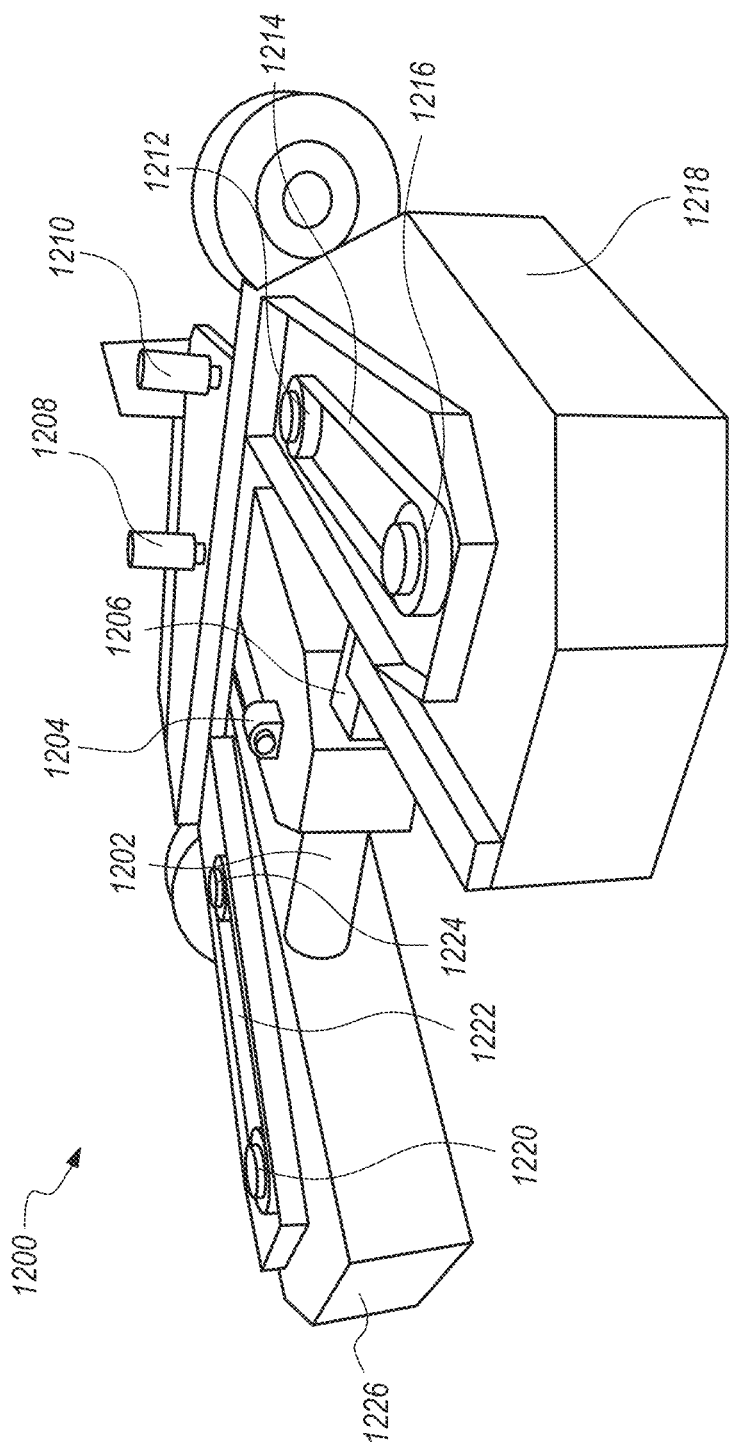
FIG. 12 is a perspective view illustrating an embodiment of a system for independent frequency control of a shaker head depicting a shaker head during fit-up integration.

FIG. 12 is a perspective view illustrating an embodiment of a system 1200 for independent frequency control of shaker head 1112 depicting shaker head 1112 before installation on a carriage or chassis. Shaker head 1112 includes hydraulic clamp cylinders 1202, 1206 that close jaws 1218, 1226 onto the tree. Hanger points 1204, 1208, 1210 are used to mount shaker head 1112 to the carriage. Sprockets 1212, 1224s mount to the shaft of a hydraulic motor (not shown). Synchronous belts 1214, 1216 couple the motor shafts to the eccentric weight shafts. Sprockets 1216, 1220 are mounted to the eccentric weight shafts. Eccentric weight chambers 1218, 1226 are the chambers in which the eccentric masses spin.

Figure 13:
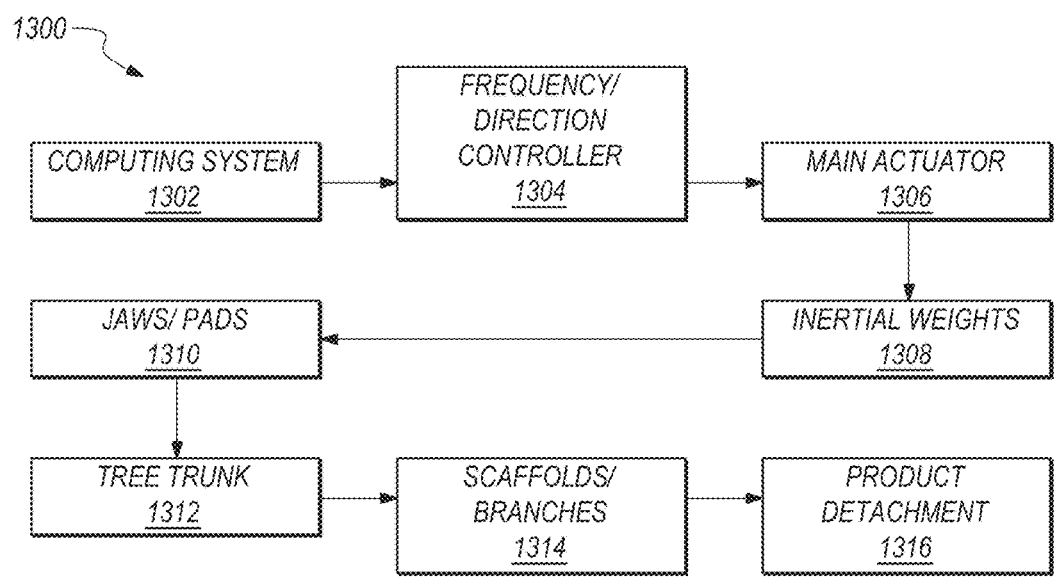
FIG. 13 is a diagram of a control influence chain for an embodiment of independent frequency control of a shaker head.

FIG. 13 is a diagram of a control influence chain 1300 for an embodiment of independent frequency control of a shaker head. FIG. 13 illustrates how a computing system 1302 (e.g., computing system 1900 (FIG. 19)) may interface with a frequency/direction controller 1304 to influence a main actuator 1306 (e.g., linear actuator 702 (FIG. 7) and any of the hydraulic systems depicted for rotating an eccentric mass) of an inertial weight 1308 (e.g., eccentric mass 518,(FIG. 5). Main actuator 1306 influences inertial weights 1308, which, when clamped to a tree by jaws/pads 1310, influence, in turn, tree trunk 1312, branches 1314, and finally, product 1316.

In times past, the industry has strived toward finding "silver bullet" shaking setups in the form of a magic pattern (geometry) or magic ratio (since, typically, the ratios are fixed). In contrast, embodiments allow a particular shake sequence to have as complex or simple a velocity profile as the user would prefer ("velocity profile" and "frequency profile" may used interchangeably in this specification). That is, an embodiment may be controlled to imitate a single, specific machine by creating fixed speed/ratio profiles or may be controlled to imitate a combination of a number of different machines (a number of different speed/ratio profiles)—depending on what may be considered best for the tree.

Thus, with embodiments, as the tree evolves, the shake sequence may evolve in an optimal way along with it. This ability to change the shake frequency with time changes the equations, slightly, making $F_1$ and $F_2$ functions of time. In the equation below, $F_1$ and $F_2$ have been expressed as functions of time.

$$x(t)=E_1 \cos(F_1(t)*t)+E_2 \cos(F_2(t)*t) \quad \text{(Eq. 5)}$$

$$y(t)=E_1 \sin(F_1(t)*t)+E_2 \sin(F_2(t)*t) \quad \text{(Eq. 6)}$$

Figure 14:
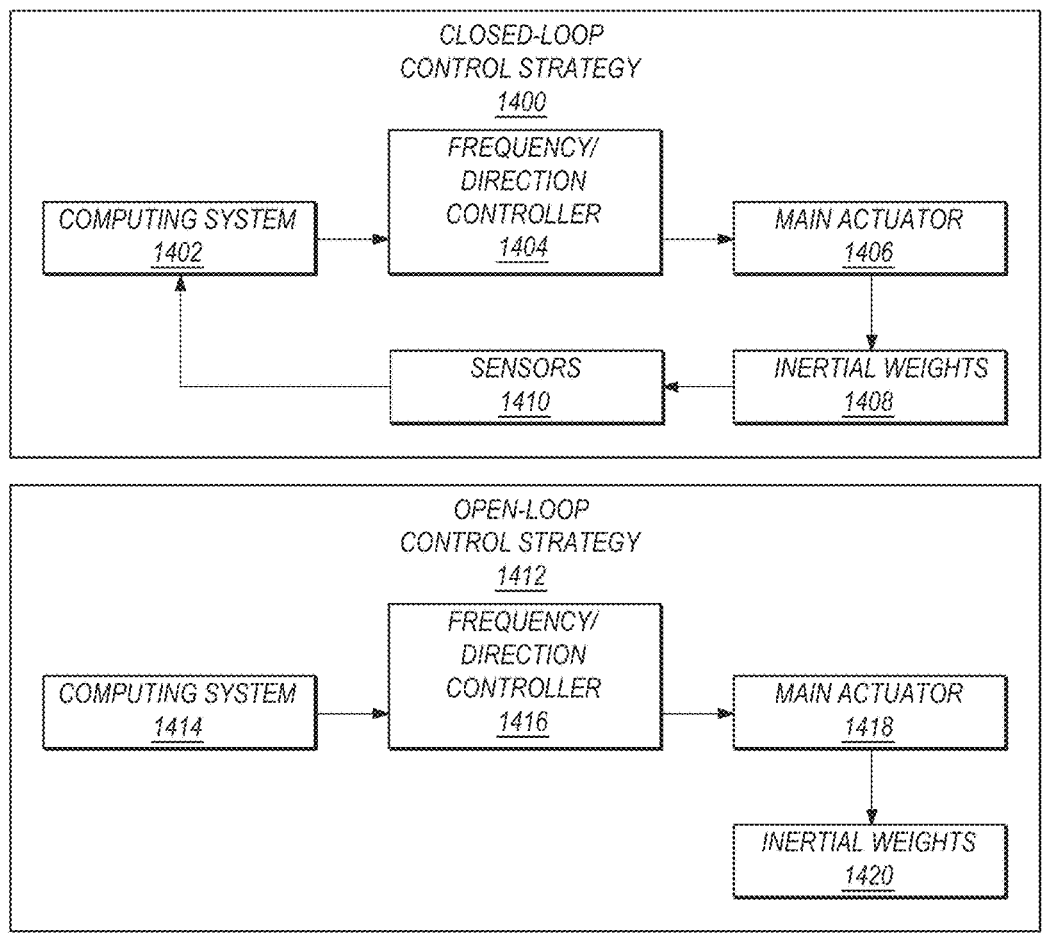
FIG. 14 is a diagram illustrating and comparing closed-loop control of an embodiment of independent frequency control of a shaker head vs. of an embodiment of independent frequency control of a shaker head.

FIG. 14 is a diagram illustrating and comparing closed-loop control 1400 of an embodiment of independent frequency control of a shaker head vs. open-loop control 1412 of an embodiment of independent frequency control of a shaker head. An embodiment may drive the eccentric using an open-loop (not using an automatic-feedback-controller) control 1412. An embodiment may drive the eccentrics using a closed-loop control 1400 (including a feedback-controller) in order to eliminate (speed accuracy) tuning steps, increase accuracy and consistency and improve transient response. In an example embodiment using open-loop control 1412, a computing system 1414 provides input to a frequency/direction controller 1416, which provides input to a main actuator 1418, which provides input to one or more inertial weights 1420. In an example embodiment using closed-loop control 1400, a computing system 1402 provides input to a frequency/direction controller 1404, which provides input to a main actuator 1406, which provides input to one or more inertial weights 1408. Sensors 1410 may detect, for example, various aspects of the movement of inertial weights 1408 and provide that input to computing system 1402, which may modify subsequent input to Frequency/direction controller 1404 based on the input from sensors 1410.

Figure 15:
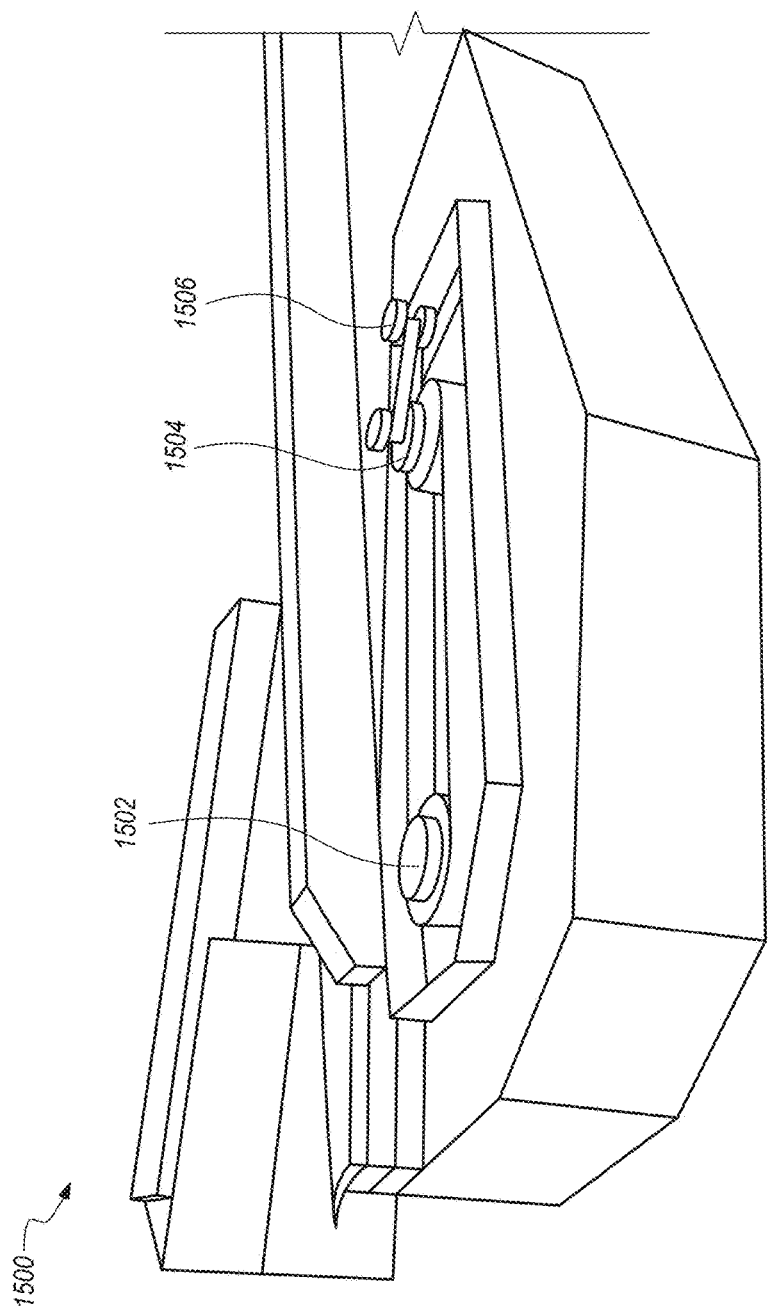
FIG. 15 is a perspective view illustrating an embodiment of a system for independent frequency control of a shaker head with closed-loop control of the eccentric speed.

FIG. 15 is a perspective view illustrating an embodiment of a system 1500 for independent frequency control of a shaker head with closed-loop control of the eccentric speed. In FIG. 15, an eccentric shaft has a synchronous sprocket 1502. That sprocket is driven directly by a sprocket 1504 attached to the shaft of a hydraulic motor (not shown). In an embodiment, above drive sprocket 1504 there may be an additional, smaller sprocket that drives a smaller synchronous belt that goes back to an absolute encoder assembly 1506. With such absolute encoder assembly 1506, the absolute position of the eccentric shaft may be monitored and used for data acquisition and closed-loop control. An appropriate encoder sensor is made by IFM, model RM8002. An incremental encoder may also be used, provided it can survive the high vibration environment.

In an embodiment, an automatic controller may adjust the displacement of a hydraulic pump that controls the speed of a hydraulic motor driving the eccentric. In the embodiment, for feedback (i.e., closed-loop control), the discrete derivative of the digital position of the encoder is calculated, which gives the speed and direction of the motor. This feedback may be fed into a PI controller with gain scheduling (depending on the eccentric configuration) for automatic closed-loop control. Since the reference signal is in terms of the speed over time, this provides the requisite reference and feedback signals to make control automatic. In an embodiment, the speed of the eccentric may be measured by a flow sensor along the flow path between the pump and the motor, since hydraulic oil is essentially incompressible for these purposes. An incremental encoder could have been used (assuming that it could survive the high vibration environment).

Using feedback for closed-loop control purposes is beneficial for several reasons. For a first reason, knowing the actual output speed of the eccentric provides the ability for more consistent, year-to-year shake patterns. Knowing the desired output speed and driving to that output speed reduces considerably the uncertainty in the output speed that may be caused by environmental factors such as oil temperature and component wear. Thus, feedback control reduces the need to re-tune the shaker apparatus to compensate for such environmental factors and improves the consistency of a shake. Consistency is an aspect of the ongoing optimization efforts that growers and harvesters aspire to. For a second reason, because of the complex dynamics experienced by the motors and eccentrics during the course of a shake sequence, automatic control using feedback helps reject the disturbances naturally imposed by the moving-frame of the shaker head and the non-constant loads that present themselves to the motors. By the same token, since each tree responds differently, it is desirable to continue to use the same true shake sequence and not make it dependent on the tree's response to this reference signal. Feedback control allows for individual tailoring (a particular, individual tree receives a custom shake), or group tailoring (each tree of a type of tree receives the same shake), to provide a consistent shake sequence. For a third reason, the transient response may be improved compared to a non-feedback scenario, allowing the proper frequencies and forces at the right time. And steady-state error may be eliminated by using an integrating term in the controller topology (e.g. PI or PID structures).

Tuning The System

Having the ability to change frequencies dynamically is very helpful in giving freedom to the operator or supervisor in the field, but also presents another challenge: determining what the frequencies should be now that the frequencies may be changed at will. In an embodiment, the tuning process is abstracted to make the tuning process easier and more intuitive.

At a high level, there are several ways to begin tuning. If simplicity is the goal, tuning may use terminology with which the industry is familiar, such as ratio, speed, and duration. In an embodiment, with the need to view frequency ratios that vary, a graphical user interface may display a timeline view of the speeds. In the embodiment, an interface shows the speeds of each wheel on the vertical axis and time on the horizontal axis. Each time-frame can be modified to request a different speed of an individual eccentric at that time. Finally, viewing tuning from the frequency/shape/force point of view, a user interface may map the two frequencies being tuned to a two-dimensional plane where each axis is one frequency. Then, the interface may record or directly control the frequency progression as a series of coordinates in that plane.

Figure 1:
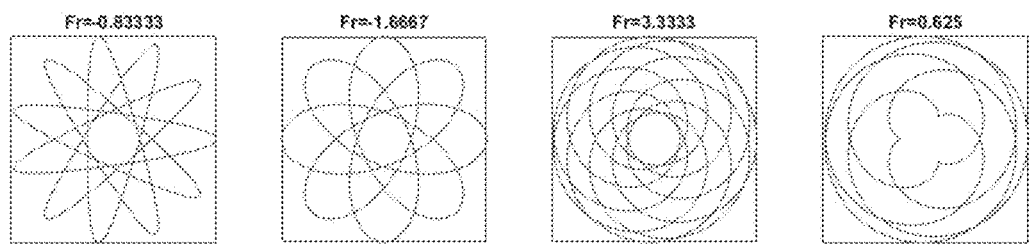
FIG. 1 depicts examples of trochoid shapes based on different frequency ratios.

Each of these interfaces is useful in different scenarios. For example, when shaking prune trees, which are not typically as challenging to tune for, it may be most expedient to start shaking with a ratio of 0 (so frequency 1 is 0 and frequency 2 is whatever is chosen) and just see which frequencies the trees respond best to in a simple way. Once a rough exploration has been done, then a ratio that provides an efficient, safe geometry pattern for removal should be chosen. Finally, the duration of shake should be chosen. Since prune trees are somewhat brittle, geometric patterns with "points" that are too sharp can result in broken branches. Regarding "points," referring to FIG. 1 for example, and the plot on the far left with Fr=−0.83333, the points are the tips of the flower petals of the geometric output pattern. Sometimes points may be very sharp, sometimes they may be more like big huge loops (as in the other examples of FIG. 1). Also, because higher frequencies tend to work better with materials that are relatively more rigid, the frequency ratio should likely be negative so that the beat frequency will be higher than the two primary frequencies—a negative frequency ratio corresponds to a beat frequency that is higher than the two primary frequencies.

On the other end of the spectrum, olives trees are extremely difficult to effectively shake and the tuning is far more complex. This is true for several reasons. First, the typical pruning style of olive trees is a "weeping willow" shape, which is more challenging to excite. Second, the olives have relatively low mass compared to other fruits/nuts. And third, since shaking an olive tree takes much longer than other crops (e.g., 10-15 seconds compared with 1-3 seconds for others), there is more opportunity for both the tree and the shake to evolve. To begin tuning an IFC-based shake for an olive orchard, an embodiment of a frequency/frequency graphical user interface may be valuable, since it allows a person to tune the shake in real-time while watching the tree and seeing it's response.

In an embodiment of a frequency/frequency control interface a user may move a finger or stylus away from the origin to a location on the interface plane (frequency 1 v. frequency 2) where the tree seems to respond the best. The embodiment is somewhat like reading a topological map, except that the user traverses the map with the user's finger or stylus and evaluates the effectiveness by watching (and listening) to the response of the tree. As a tree evolves in the shake, the user may begin to see how the shake needs to evolve to keep the tree "in the zone" of optimal shaking. This is an iterative and exploratory process that will be different each time, but is actually much easier than it sounds once a user has a few minutes of training with the interface.

Figure 16:
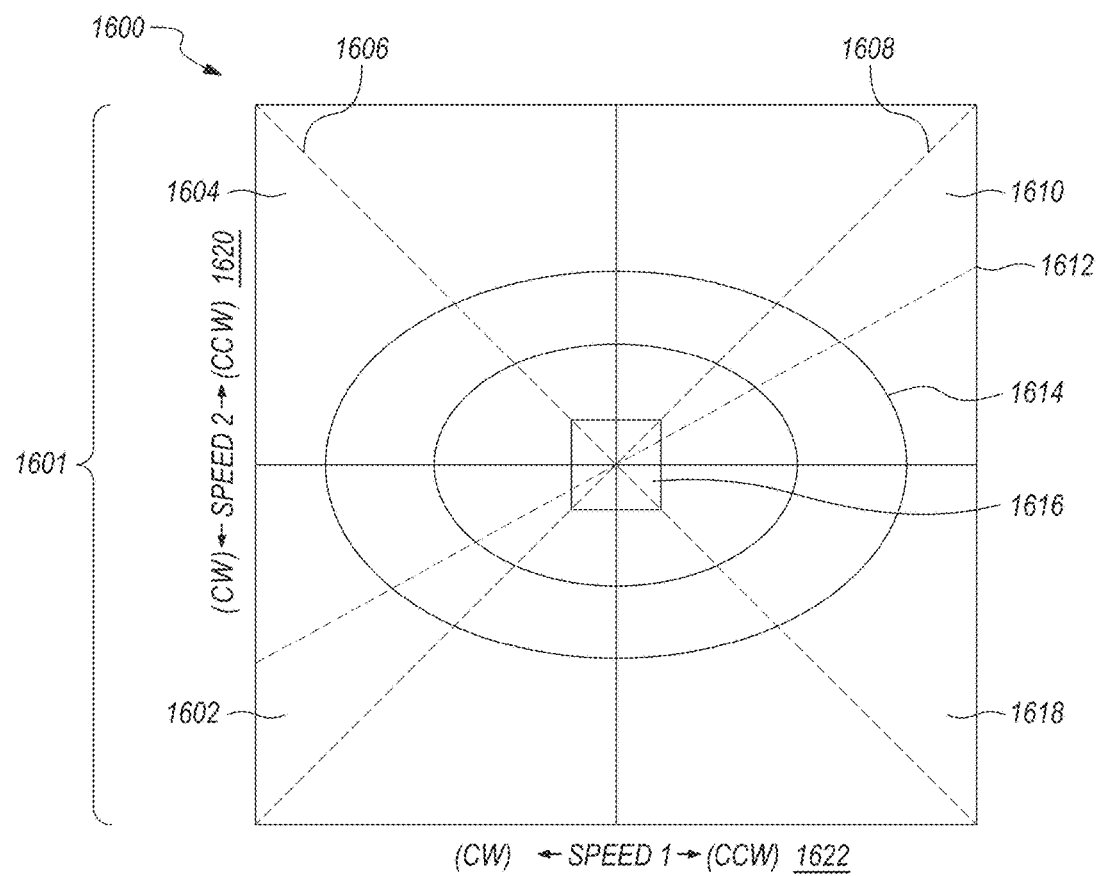
FIG. 16 is an illustration of an embodiment of a frequency/frequency user interface for an embodiment of independent frequency control of a shaker head.

FIG. 16 is an illustration of an embodiment of a frequency/frequency user interface (FFUI) 1600 for an embodiment of independent frequency control of a shaker head. In FFUI 1600, a chart area 1601 (the largest square) is the area used for input of the desired frequency combination. For a point on chart area 1601, an X-coordinate axis 1622 indicates the speed of a first eccentric mass (not shown), where values to the right of the center line indicate a clockwise (CW) spin and values to the left of the centerline indicate a counter-clockwise (CCW) spin. For the same point on chart area 1601, a Y-coordinate axis 1620 indicates the speed of a second eccentric mass (above centerline is CW, below the centerline is CCW). Interface 1600 maps the "space" of shaking a tree in an interesting way. With, for example, typical fixed eccentrics the output forces form constant levels that make ellipses, e.g., force guide 1614, centered about an origin 1616. Such ellipses are useful in that they indicate a constant force to a user, allowing the user to avoid over-shaking the tree by staying within a force guide, e.g., force guide 1614. A programmable ratio line 1612 may be set to any value. The value corresponds to the slope of ratio line 1612 and also represents a constant geometry output of the pattern in the plane. Interface 1600 allows both real-time and offline creation and editing of shake sequences. Marking a first point on interface 1600 sets the shake conditions for a first point in time. Marking a subsequent point set the shake conditions for the next point in time. The points are connected by a line. The end-product set of points on a line becomes a pattern on interface 1600—a pattern is much easier to remember and imitate than a sequence of numbers. Thus, interface 1600 is both a control element as well as a feedback element since both the target pattern and an actual shake pattern may be displayed simultaneously—multiple patterns may be overlaid. No pattern is shown on FIG. 16 for clarity.

Figure 17:
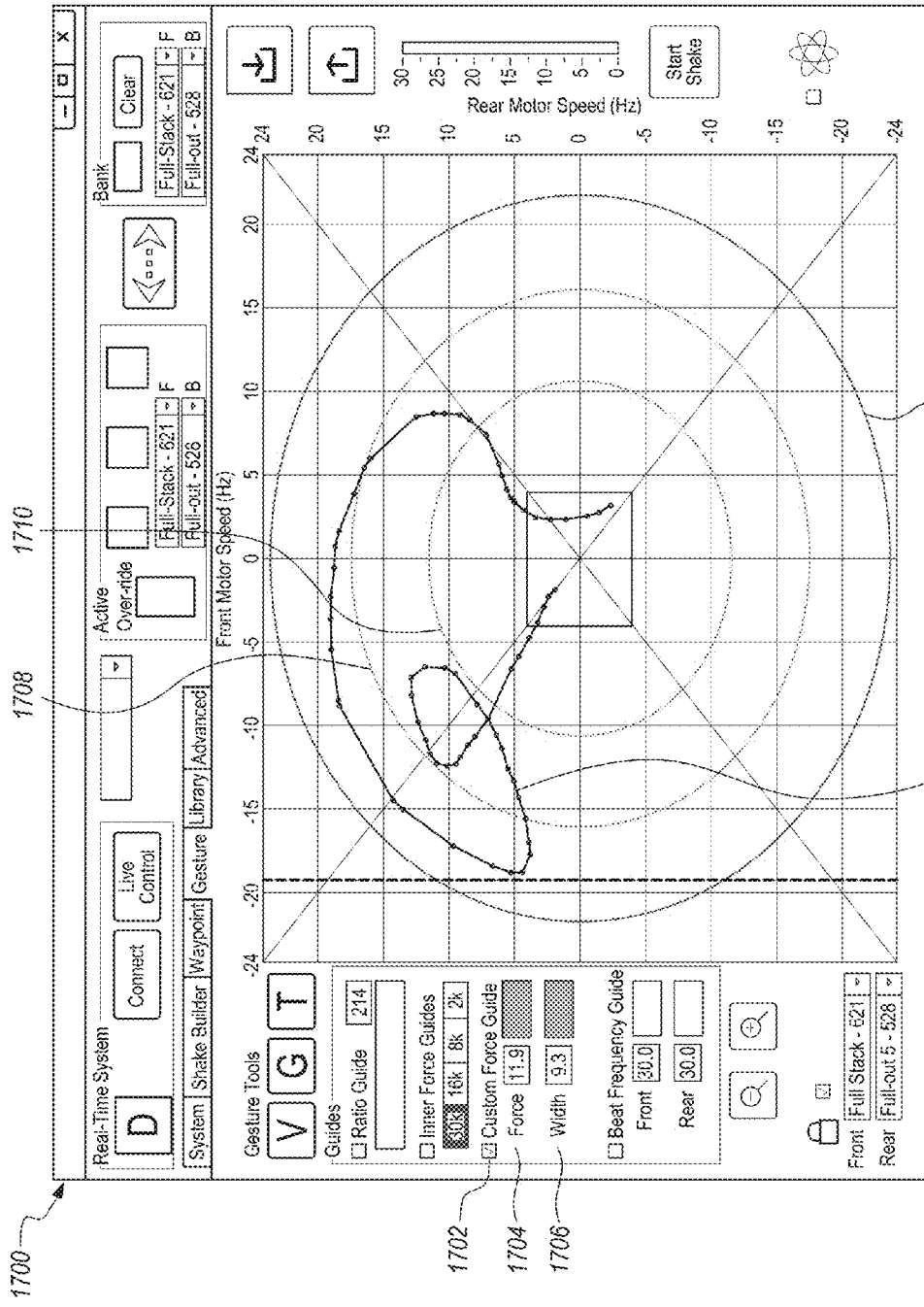
FIG. 17 is an illustration of an embodiment of a frequency/frequency user interface for an embodiment of independent frequency control of a shaker head.

FIG. 17 is an illustration of an embodiment of a frequency/frequency user interface 1700 for an embodiment of independent frequency control of a shaker head. In FIG. 17, line 1712 connecting the dots represents a shaking pattern. Time zero is represented by the end dot in the fourth quadrant. Each subsequent dot represents the front eccentric speed (the speed of the motor in front, as determined by the direction the of chassis travel) and rear eccentric speed (the speed of the motor in the rear, as determined by the direction of chassis travel) at the subsequent point in time. In FIG. 17, a custom force guide box 1702 is checked. This allows the user to set a target force 1704 of, e.g., 11.9 k-lbf, and set a force guide width 1706 of, e.g., 9.3 k-lbf. In this way, since it is extremely difficult to hit an exact force, the user may dictate the target force that they are shooting for and then what kind of tolerance they could accept using the force width. A maximum force 1708 is based on these parameters (force+½ force width). A minimum force 1710 is also based on these parameters (force−½ force width). The cyan color pads to the right of the force 1704 and width 1706 edit boxes can also be clicked to interactively position the guides based on the position of the cursor. An force guide 1714 is set at 30 k-lbf as indicated by the corresponding color under "Inner Force Guides."

Expected Benefits of Embodiments

Olives are considered one of the hardest tree crops to harvest. An embodiment has achieved in olive harvesting what very few harvesting systems can claim: consistently over 90% removal on average. As described above, the performance of a harvester is dependent on many factors that make it difficult to predict efficiency. Still, it is anticipated that embodiments will be able to remove 50-70% of the product that other harvesting systems leave remaining on the tree. For example, with table olives, typical machinery may remove 65% of the total tree's product. That means that of the 35% of the product that remains, it is estimated that embodiments may remove 50-70% of that remaining product—with the result that only 17.5-10.5% of the product remains on the tree. In other words, embodiments are anticipated to increase overall yield to 82.5-89.5%, which maps very well to the experimental results, which have shown 80-90% removal.

In terms of tree health, embodiments may add two to three years of life for any given tree crop due to the reduction in damage to the tree that may be gained from adjusting the geometry output of the head and from not dwelling in frequency bands that may damage the tree. It is also expected that year-to-year health costs will be reduced significantly because of the reduction in damage to trunks, roots, and branches that are often breach points for incoming diseases. If the trees do not contract various diseases or attract pests, then the costs associated with the chemicals and other disease and pest mitigation efforts can be lowered.

Embodiments may also lower harvesting costs because the same embodiment may be easily adapted to multiple different crops. Embodiments are thus able to be used on multiple crops throughout the year, resulting in a better return on investment that current, non-adaptable equipment.

Furthermore, embodiments may provide growers with increased income each year by removing more product from their trees. The increase in removal will also allow growers to spend less money and time removing product that lingers—an operation performed to mitigate pest problems. If enough product is removed by an embodiment, operations directed to mitigating pest problems (e.g., mummy shaking) may be entirely eliminated.

FIG. 18 is a simplified block diagram of a distributed computer network 1800 of an embodiment of independent frequency control of a shaker head. Computer network 1800 includes a number of client systems 1805, 1810, and 1815, and a server system 1820 coupled to a communication network 1825 via a plurality of communication links 1830. Communication network 1825 provides a mechanism for allowing the various components of distributed network 1800 to communicate and exchange information with each other. In an embodiment, the onboard computing system of FIGS. 11 and 12 may be one of client systems 1805, 1810, and 1815 and may be used to control embodiments of IFC. In an embodiment, the onboard computing system of FIGS. 11 and 12 may itself be controlled by another of client systems 1805, 1810, and 1815.

Communication network 1825 may itself be comprised of many interconnected computer systems and communication links. Communication links 1830 may be hardwire links, optical links, satellite or other wireless communications links, wave propagation links, or any other mechanisms for communication of information. Various communication protocols may be used to facilitate communication between the various systems shown in FIG. 18. These communication protocols may include TCP/IP, HTTP protocols, wireless application protocol (WAP), vendor-specific protocols, customized protocols, and others. While in one embodiment, communication network 1825 is the Internet, in other embodiments, communication network 1825 may be any suitable communication network including a local area network (LAN), a wide area network (WAN), a wireless network, a intranet, a private network, a public network, a switched network, and combinations of these, and the like.

Distributed computer network 1800 in FIG. 18 is merely illustrative of an embodiment and does not limit the scope of the claims. One of ordinary skill in the art would recognize other variations, modifications, and alternatives. For example, more than one server system 1820 may be connected to communication network 1825. As another example, a number of client systems 1805, 1810, and 1815 may be coupled to communication network 1825 via an access provider (not shown) or via some other server system.

Client systems 1805, 1810, and 1815 typically request information from a server system which provides the information. Server systems by definition typically have more computing and storage capacity than client systems. However, a particular computer system may act as both a client or a server depending on whether the computer system is requesting or providing information. Aspects of the embodiments may use a client-server environment or a cloud-cloud computing environment.

Server 1820 is responsible for receiving information requests from client systems 1805, 1810, and 1815, performing processing required to satisfy the requests, and for forwarding the results corresponding to the requests back to the requesting client system. The processing required to satisfy the request may be performed by server system 1820 or may alternatively be delegated to other servers connected to communication network 1825.

Client systems 1805, 1810, and 1815 enable users to access and query information or applications stored by server system 1820. Some example client systems include portable electronic devices (e.g., mobile communication devices) such as the Apple iPhone®, the Apple iPad®, the Palm Pre™, or any device running the Apple iOS™, Android™ OS, Google Chrome OS, Symbian OS®, Windows Mobile® OS, Palm OS® or Palm Web OS™. In a specific embodiment, a "web browser" application executing on a client system enables users to select, access, retrieve, or query information and/or applications stored by server system 1820. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others.

Figure 19:
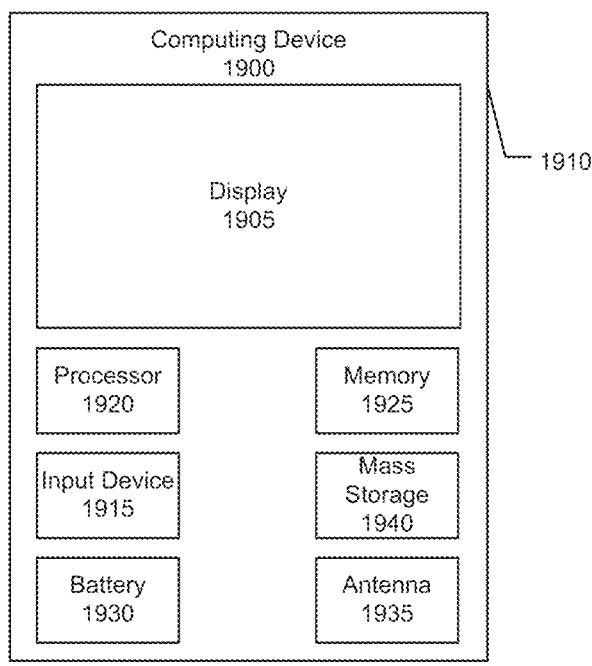
FIG. 19 illustrates an exemplary computing device of an embodiment of a system for independent frequency control of a shaker head.

FIG. 19 illustrates an exemplary computing device of an embodiment of a system for independent frequency control of a shaker head, which may serve as any of client systems 1805, 1810, 1815. In an embodiment, a user may interface with the IFC system through a client computing device 1900, such as shown in FIG. 19. Computing device 1900 (which may be, e.g., a personal computer, a mobile client communication device, or a portable electronic device) includes a display, screen, or monitor 1905, housing 1910, and input device 1915. Housing 1910 houses familiar computer components, some of which are not shown, such as a processor 1920, memory 1925, battery 1930, speaker, transceiver, antenna 1935, microphone, ports, jacks, connectors, camera, input/output (I/O) controller, display adapter, network interface, mass storage devices 1940, and the like.

Input device 1915 may also include a touchscreen (e.g., resistive, surface acoustic wave, capacitive sensing, infrared, optical imaging, dispersive signal, or acoustic pulse recognition), keyboard (e.g., electronic keyboard or physical keyboard), body movement tracking devices, holographic input devices, buttons, switches, stylus, appendages (fingers), or combinations of these.

Mass storage devices 1940 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

Embodiments may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 19 is but an example of a computer system suitable for use with the present embodiments. Other configurations of subsystems suitable for use with the present embodiments will be readily apparent to one of ordinary skill in the art. For example, in a specific embodiment, the computing device is mobile communication device such as a smartphone or tablet computer. Some specific examples of smartphones include the Droid Incredible and Google Nexus One, provided by HTC Corporation, the iPhone or iPad, both provided by Apple, and many others. The computing device may be a laptop or a netbook. In another specific embodiment, the computing device is a non-portable computing device such as a desktop computer or workstation.

A computer-implemented or computer-executable version of the program instructions useful to practice embodiments may be stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice embodiments may be stored or reside in RAM or cache memory, or on mass storage device 1940. The source code of this software may also be stored or reside on mass storage device 1940 (e.g., flash drive, hard disk, magnetic disk, tape, or CD-ROM). As a further example, code useful for practicing embodiments may be transmitted via wires, radio waves, or through a network such as the Internet. In another specific embodiment, a computer program product is provided that includes a variety of software program code to implement the features.

Computer software products may be written in any of various suitable programming languages, such as Visual Basic, Lua, C, C++, C#, Pascal, Fortran, Perl, MATLAB® (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64Edition, Windows Vista, Windows 7, Windows CE, Windows Mobile, Windows Phone 7), Linux, HP-UX, UNIX, Sun OS, Solaris, Mac OS X, Alpha OS, AIX, IRIX32, IRIX64, or QNX. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing embodiments using a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

It should be understood that the arrangements of the hardware devices illustrated above are but a few of the possible embodiments and that other arrangements are possible. It should also be understood that the various system components (and means) defined by the claims, described above, and illustrated in the various diagrams represent components that are configured to perform the functionality described herein. For example, one or more of these system components (and means) can be realized, in whole or in part, by at least some of the components illustrated in the arrangement of computing device 1900. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIGS. 18 and 19. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description, the subject matter may be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of the disclosure. These steps are merely exemplary and are not meant to be limiting in any way. Other steps and functions may be contemplated without departing from this disclosure.

What is claimed is:

1. A shaker head, comprising:
   a clamp configured to connect the shaker head to an object;
   a first axle connected to the clamp and a second axle connected to the clamp;
   a first mass with a first center of rotation, the first mass being configured to be rotated about the first axle such that the first mass does not rotate about the first center of rotation;
   a second mass with a second center of rotation, the second mass being configured to be rotated about the second axle such that the second mass does not rotate about the second center of rotation;
   a first hydraulic motor coupled to the first mass, the first hydraulic motor causing the first mass to rotate about the first axle when supplied with hydraulic fluid power;
   a second hydraulic motor coupled to the second mass, the second hydraulic motor causing the second mass to rotate about the second axle when supplied with hydraulic fluid power;
   a hydraulic fluid power control system configured to supply a first flow rate of hydraulic fluid from a fluid source to the first hydraulic motor and to supply a second flow rate of hydraulic fluid from the fluid source to the second hydraulic motor, wherein the supply of the first flow rate of fluid is independent from the supply of the second flow rate of fluid; and
   an electronic control system in communication with the hydraulic fluid power control system, the electronic control system configured to receive user input using a graphical user interface and to control the hydraulic fluid power control system in supplying the first flow rate of fluid to the first hydraulic motor independently from supplying the second flow rate of hydraulic fluid to the second hydraulic motor.

2. The shaker head of claim 1, wherein:
   (i) the hydraulic fluid power control system includes a first pump motor connected to power a first fixed displacement hydraulic pump connected to supply the first flow rate of fluid to the first hydraulic motor;
   (ii) the first pump motor is variable in speed and direction; and (iii) the electronic control system is configured to control the speed and direction of the first pump motor.

3. The shaker head of claim 1, wherein:
(i) the hydraulic fluid power control system includes a first pump motor connected to power a first variable displacement hydraulic pump connected to supply the first flow rate of fluid to the first hydraulic motor;
(ii) the first pump motor is variable in speed and direction; and
(iii) the electronic control system is configured to control the speed and direction of the first pump motor and control the displacement of the variable displacement hydraulic pump.

4. The shaker head of claim 1, wherein:
(i) the hydraulic fluid power control system includes a first variable displacement hydraulic pump connected to supply the first flow rate of fluid to the first hydraulic motor;
(ii) the electronic control system is configured to control a first displacement of the first variable displacement hydraulic pump;
(iii) the electronic control system is configured to control a first frequency at which the first variable displacement hydraulic pump operates;
(iv) the hydraulic fluid power control system includes a second variable displacement hydraulic pump connected to supply the second flow rate of fluid to the second hydraulic motor;
(v) the electronic control system is configured to control a second displacement of the second variable displacement hydraulic pump; and
(vi) the electronic control system is configured to control a second frequency at which the second variable displacement hydraulic pump operates.

5. The shaker head of claim 4, wherein a transmission is connected to the first and second variable displacement hydraulic pumps and wherein the electronic control system is configured to control a first speed at which the transmission drives the first variable displacement hydraulic pump and a second speed at which the transmission drives the second variable displacement hydraulic pump.

6. The shaker head of claim 1, wherein the hydraulic fluid power control system includes:
(i) a first control valve connected to the first hydraulic motor and configured to control the first flow rate of fluid and a first direction of flow through the first hydraulic motor; and
(ii) a second control valve connected to the second hydraulic motor and configured to control the second flow rate of fluid and a second direction of flow through the second hydraulic motor, and wherein the electronic control system is configured to control the first control valve and the second control valve.

7. The shaker head for a harvester of claim 6 further comprising a third control valve connected to the first control valve and to the second control valve and configured to control a third flow rate of fluid to the first control valve and second control valve.

8. The shaker head of claim 1 further comprising:
(i) at least one first sensor configured to sense at least one first characteristic of the first mass; and
(ii) at least one second sensor configured to sense at least one second characteristic of the second mass, and wherein the electronic control system is configured to control the hydraulic fluid power control system in supplying the first flow rate of fluid to the first hydraulic motor and in supplying the second flow rate of hydraulic fluid to the second hydraulic motor based in part on the at least one first and second characteristics.

9. The shaker head of claim 8, wherein the at least one first sensor and the at least one second sensor include one or both of a position sensor and a vibration sensor and the at least one first characteristic and the at least one second characteristic include one or both of a frequency.

10. The shaker head of claim 1, wherein the first axle and the second axle are parallel.

11. A shaker head, comprising:
a clamp configured to connect the shaker head to an object;
a first linear actuator connected to the clamp;
a first mass connected to the first linear actuator;
a second linear actuator connected to the clamp;
a second mass connected to the second linear actuator;
a power supply system connected to the first linear actuator and the second linear actuator; and
an electronic control system connected to the power supply system, the electronic control system configured to receive user input using a graphical user interface and to control the power supply system in supplying power to the first linear actuator independently from supplying power to the second linear actuator.

12. The shaker head of claim 11, wherein the power supply system includes a hydraulic fluid power control system connected to the first linear actuator and the second linear actuator, the hydraulic fluid power control system configured to supply a first flow rate of hydraulic fluid from a fluid source to the first linear actuator and to supply a second flow rate of hydraulic fluid from a fluid source to the second linear actuator, wherein the supply of the first flow rate of fluid is independent from the supply of the second flow rate of fluid, the hydraulic fluid power control system including:
(i) a first control valve connected to the first linear actuator and configured to control the first flow rate of fluid and a first direction of flow to the first linear actuator, and
(ii) a second control valve connected to the second linear actuator and configured to control the second flow rate of fluid and a second direction of flow to the second linear actuator, and wherein the electronic control system is configured to control the first control valve and the second control valve, the control of the first control valve being independent from the control of the second control valve.

13. The shaker head of claim 12, wherein the electronic control system is configured to control a displacement of a variable displacement pump of the fluid source.

14. The shaker head of claim 11, wherein the power supply system includes an electric power control system connected to the first linear actuator and the second linear actuator, the electric power control system configured to supply electric power from an electric power source to the first linear actuator and the second linear actuator, the supply of electric power to the first linear actuator being independent from the supply of electric power to the second linear actuator, the electric power control system including:
(i) a first controller connected to the first linear actuator and configured to control electric power to the first linear actuator, and
(ii) a second controller connected to the second linear actuator and configured to control a electric power to the second linear actuator, and
wherein the electronic control system is configured to control the first controller and the second controller, the control of the first controller being independent from the control of the second controller.

15. The shaker head of claim 14, wherein the electronic control system is further configured to control a generator of the electric power source.

16. The shaker head of claim 11 further comprising:
   (i) at least one first sensor configured to sense at least one first characteristic of the first mass; and
   (ii) at least one second sensor configured to sense at least one second characteristic of the second mass, and wherein the electronic control system is configured to control the power supply system in supplying power to the first linear actuator and in supplying fluid power to the second linear actuator based in part on the at least one first and second characteristics.

17. The shaker head of claim 16, wherein the at least one first sensor and the at least one second sensor include one or both of a position sensor and a vibration sensor and the at least one first characteristic and the at least one second characteristic include one or both of a frequency.

18. The shaker head of claim 11, wherein the first linear actuator and the second linear actuator are orthogonal to each other.

19. A shaker head, comprising:
   a clamp configured to connect the shaker head to an object;
   a first axle connected to the clamp and a second axle connected to the clamp;
   a first mass with a first center of rotation, the first mass being configured to be rotated about the first axle such that the first mass does not rotate about the first center of rotation;
   a second mass with a second center of rotation, the second mass being configured to be rotated about the second axle such that the second mass does not rotate about the second center of rotation;
   a first electric motor coupled to the first mass, the first electric motor causing the first mass to rotate about the first axle when supplied with electric power;
   a second electric motor coupled to the second mass, the second electric motor causing the second mass to rotate about the second axle when supplied with electric power;
   a power supply system configured to supply electric power to the first electric motor and the second electric motor, wherein the supply of electric power to the first electric motor is independent from the supply of electric power to the second electric motor; and
   an electronic control system in communication with the power supply system, the electronic control system configured to receive user input using a graphical user interface and to control the power supply system in supplying power to the first electric motor independently from supplying power to the second electric motor.

20. The shaker head of claim 19, wherein the first axle and the second axle are parallel.

* * * * *